United States Patent
Armstrong

(10) Patent No.: US 8,686,331 B2
(45) Date of Patent: Apr. 1, 2014

(54) DYNAMIC WAVEFRONT CONTROL OF A FREQUENCY CONVERTED LASER SYSTEM

(75) Inventor: J. Joseph Armstrong, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 257 days.

(21) Appl. No.: 13/194,335

(22) Filed: Jul. 29, 2011

(65) Prior Publication Data
US 2012/0032065 A1 Feb. 9, 2012

Related U.S. Application Data

(60) Provisional application No. 61/371,704, filed on Aug. 8, 2010.

(51) Int. Cl.
*G01J 1/20* (2006.01)
(52) U.S. Cl.
USPC ............ 250/201.9; 250/205; 359/326; 372/9; 372/29.01; 372/38.02

(58) Field of Classification Search
USPC ............ 250/205, 201.2, 201.9; 359/326, 328; 372/9, 29.01, 29.001, 29.014, 29.016
See application file for complete search history.

(56) References Cited

U.S. PATENT DOCUMENTS

| | | | |
|---|---|---|---|
| 4,326,800 A | 4/1982 | Fitts | |
| 4,621,924 A | 11/1986 | Williams | |
| 5,498,935 A * | 3/1996 | McMahan et al. | 315/241 P |
| 6,135,995 A | 10/2000 | Arnett et al. | |
| 2008/0253417 A1 | 10/2008 | Livingston | |
| 2012/0120481 A1 * | 5/2012 | Armstrong | 359/328 |

\* cited by examiner

*Primary Examiner* — Kevin Pyo
(74) *Attorney, Agent, or Firm* — Suiter Swantz pc llo

(57) ABSTRACT

The present invention is directed to a laser system in which a current laser wavefront performance of the laser system may be monitored. Further, the laser system embodiments disclosed herein may be configured for correcting the laser wavefront internally via correction system(s) within the laser system. Still further, the correction system(s) disclosed herein may provide a long lifetime of performance and may be configured for having a minimal impact on photocontamination.

20 Claims, 19 Drawing Sheets

Figure 18  Frequency converted laser system with beam diagnostics and correction

DYNAMIC WAVEFRONT CONTROL OF A FREQUENCY CONVERTED LASER SYSTEM

CROSS-REFERENCE TO RELATED APPLICATIONS

The present application claims priority under 35 U.S.C. §119(e) to U.S. Provisional Application No. 61/371,704 entitled: Dynamic Wavefront Control of a Frequency Converted Laser System filed Aug. 8, 2010, which is hereby incorporated by reference in its entirety.

FIELD OF THE INVENTION

The present invention generally relates to illuminators used in conjunction with inspection systems, such as semiconductor wafer inspection systems and photomask inspection systems, and more particularly to a frequency converted light source for use with such inspection systems.

BACKGROUND OF THE INVENTION

Currently available frequency converted light sources may not provide a desired level of performance Thus, it would be desirable to provide a frequency converted light source that overcomes the drawbacks of currently available solutions.

SUMMARY OF THE INVENTION

Accordingly an embodiment of the present invention is directed to a laser system, including: a laser source, the laser source configured for generating and emitting fundamental light; a beam sampling device, the beam sampling device being operationally coupled with the laser source, the beam sampling device being configured for selectively sampling a portion of the emitted light; a beam diagnostics system, the beam diagnostics system being operationally coupled with the beam sampling device, the beam diagnostics system being configured for receiving the sampled portion of the emitted light and measuring a current state of a wavefront parameter of the sampled portion of the emitted light, the wavefront parameter being one of: a beam waist location of the sampled portion of the emitted light, and an astigmatism of the sampled portion of the emitted light. The laser system further includes a beam correction system, the beam correction system being operationally coupled with the beam diagnostics system, the beam correction system including at least one of: a lens or a mirror element (ex.—a controllable lens or mirror element), the beam correction system being configured for: obtaining the measured state from the beam diagnostics system; comparing the measured state of the wavefront parameter against a desired state of the wavefront parameter for the emitted light; and providing a correction to the laser system based upon said comparing. The beam diagnostics system may include a wavefront sensor which may utilize a lens array or an aperture array. In further embodiments, the beam diagnostics system may include a M-Squared (M2) measurement system, which may include a scanning slit, scanning knife edge or scanning pinhole for measuring a beam profile of the sampled portion of the emitted light. In still further embodiments, the beam sampling device may be one of: a holographic beam sampling device or a partially (low) transmitting mirror. The angle of incidence for the low transmitting mirror may be less than twenty degrees. In further embodiments, the beam sampling device may be a substrate having a first surface, which may be a partially (low) reflecting, light sampling surface (ex.—non-coated glass, fused silica, calcium fluoride and magnesium fluoride). The angle of incidence for the low reflecting surface may be less than twenty degrees. Further, the substrate may include a second surface, the second surface being coated with an anti-reflective material and may be used to sample the fundamental light. In further embodiments, the lens or mirror element may be moved from a first position to a second position when the correction is provided for obtaining a desired wavefront. Further, a temperature of the lens or mirror element may be changed from a first temperature to a second temperature when the correction is provided for obtaining a desired wavefront. Still further, a tilt angle and/or rotation angle of the lens or mirror element may be adjusted when the correction is provided for obtaining a desired wavefront. Further, a motor device, piezo device, or electrorestrictive device may be utilized for: moving the lens or mirror element from the first position to the second position; and adjusting the tilt angle or rotation angle of the lens or mirror element. Still further, the lens or mirror element may include rotationally symmetric surfaces, one of which has a cylindrical profile. In further embodiments, the beam correction system may include at least two lenses or mirror elements. A relative spacing between the lenses or mirror elements may be changed when the correction is provided for obtaining the desired wavefront. Further, each of the lenses or mirror elements may include a cylindrical surface. Still further, the lenses or mirror elements may be rotated between a first orientation, in which cylindrical surfaces of the two lenses or two mirror elements are orthogonally aligned with respect to each other, and a second orientation, in which the cylindrical surfaces of the two lenses or two mirror elements are in a parallel alignment with respect to each other when the correction is provided for obtaining a desired wavefront. In still further embodiments, the lenses may be arranged as (ex.—may function as) a telescope.

A further embodiment of the present invention is directed to a method for providing beam correction in a laser system, the method comprising: directing a portion of light emitted from a laser source of the laser system to a beam sampling device of the laser system; sampling the portion of emitted light via the beam sampling device and providing the sampled light portion to a beam diagnostics system of the laser system; measuring a current state of a parameter of the sampled portion of the emitted light via the beam diagnostics system and providing the measured state of the parameter to a beam correction system of the laser system; comparing the measured state of the parameter against a desired state of the parameter for the emitted light via the beam correction system of the laser system; and based upon said comparing, providing a correction to the laser system via the beam correction system, for obtaining a desired wavefront.

A still further embodiment of the present invention is directed to a laser system, including: a laser source, the laser source configured for generating and emitting light; a beam sampling device, the beam sampling device being operationally coupled with the laser source, the beam sampling device being configured for selectively sampling a portion of the emitted light; a beam diagnostics system, the beam diagnostics system being operationally coupled with the beam sampling device, the beam diagnostics system being configured for receiving the sampled portion of the emitted light and measuring a current state of a parameter of the sampled portion of the emitted light; and a beam correction system, the beam correction system being operationally coupled with the beam diagnostics system, the beam correction system being configured for obtaining the measured state from the beam diagnostics system, comparing the measured state of the parameter against a desired state of the parameter for the emitted light and providing a correction to the laser system based upon said comparing.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
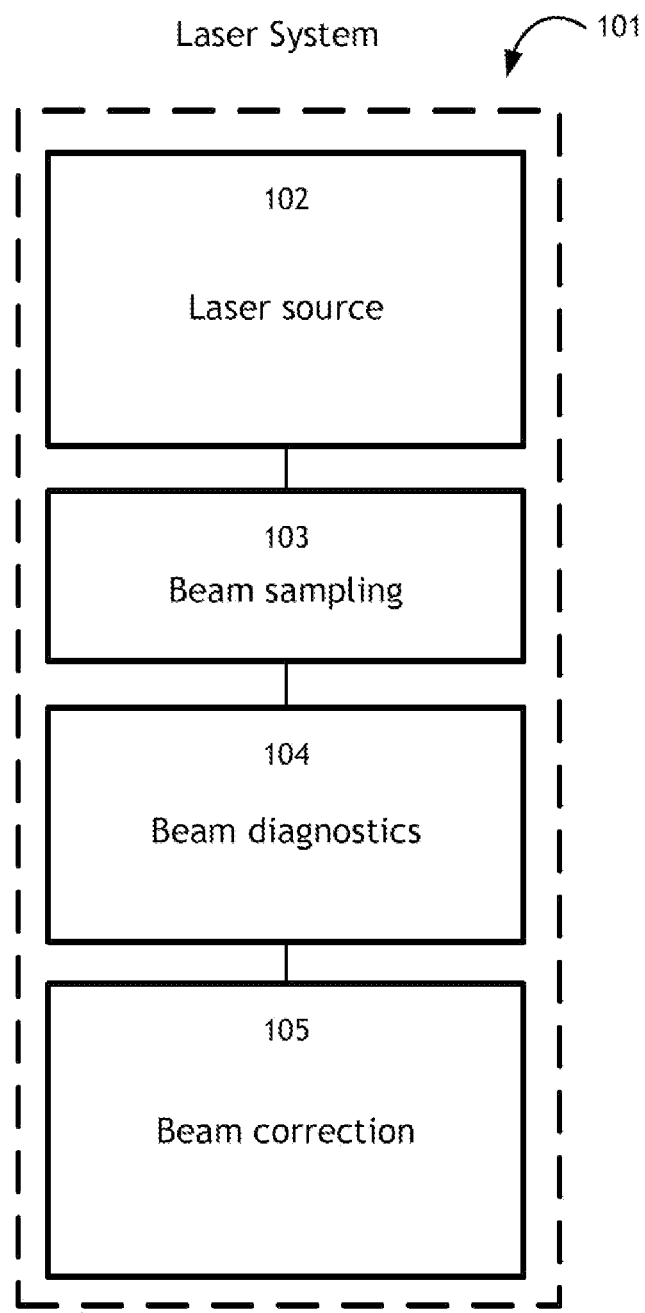
FIG. 1 is a block diagram schematic of a laser system in accordance with an exemplary embodiment of the present disclosure, the laser system including internal beam sampling, beam diagnostics, and beam correction.

Reference will now be made in detail to the presently preferred embodiments of the invention, examples of which are illustrated in the accompanying drawings.

The demands of the semiconductor industry for wafer and photomask inspection systems exhibiting high throughput and improvements in resolution are ongoing. Successive generations of such inspection systems tend to achieve higher resolution by illuminating the wafer or reticle using light energy having shorter wavelengths. Certain practical advantages may be achieved when illuminating the wafer or reticle with light with wavelengths at or below 400 nm. Providing suitable lasers for high quality wafer and photomask inspection systems presents a particular challenge. Conventional lasers generating deep ultraviolet (DUV) light energy are typically large, expensive devices with relatively short lifetimes and low average power. Wafer and photomask inspection systems generally require a laser having a generally high average power, low peak power, and relatively short wavelength for sufficient throughput and an adequate defect signal-to-noise ratio (SNR).

The primary method to provide adequate DUV power entails generating shorter wavelength light from longer wavelength light. This process of changing wavelengths is commonly called frequency conversion. Frequency conversion requires high peak power light in order to produce a nonlinear response in an optical crystal. To increase the efficiency of this process, the longer wavelength light may have high average powers, short optical pulses, and may be focused into the optical crystal. The original light is typically called fundamental light.

Generating light at wavelengths below 400 nm, and especially below 300 nm can be very challenging. Light sources used for semiconductor inspection require relatively high powers, long lifetimes, and stable performance. Light sources meeting these requirements for advanced inspection techniques are nonexistent. The lifetime, power, and stability of current DUV frequency converted lasers is generally limited by the frequency conversion crystals and conversion schemes, especially those exposed to DUV wavelengths like 355 nanometers (nm), 266 nm, 213 nm and 193 nm.

Many inspection applications require the frequency converted laser wavefront to remain stable over time. This can be a challenge because of the degradation in optics, coatings, and especially nonlinear crystals over time. The embodiments described in the present disclosure provide mechanism(s) for monitoring current laser wavefront performance and for correcting the laser wavefront internally within a laser system. Further, the correction mechanism(s) disclosed herein may have long lifetime and a minimal impact on photocontamination.

In order to create a frequency converted laser system with stable wavefront output, it is necessary to be able to know the desired wavefront and the current wavefront. Typically the desired wavefront is the wavefront produced when the laser is new. If the laser wavefront changes over time, a beam correction technique is required. Knowledge of the rate of change for the correction technique in proximity to the current value is also required in order to make feedback correction.

Referring to FIG. 1, a block diagram schematic of a laser system in accordance with an embodiment of the present disclosure is shown. Laser system 101 includes: a laser source 102; a beam sampling system 103, the beam sampling system 103 being connected to the laser source 102; a beam diagnostics system 104, the beam diagnostics system 104 being connected to the beam sampling system 103; and a beam correction system 105, the beam correction system 105 being connected to the beam diagnostics system 104. The laser source 102 may be any of a variety of lasers, but is preferably a frequency converted laser. The first step to measuring the wavefront produced by laser source 102 is to utilize the beam sampling system 103 to sample a beam provided by the laser source 102 to the beam sampling system 103. Further, the beam sampling system 103 may provide the sampled beam to the beam diagnostics system 104. Since high power laser light is desired, a minimum amount of light from laser source 102 should be provided to/utilized by the beam diagnostics system 104. Beam sampling system 103 should also not be sensitive to changes in laser polarization. Some typical schemes for sampling of a small fraction of laser power can be highly sensitive to small changes in polarization. Ideally, the beam sampling system 103 should also not significantly modify the wavefront of laser source 102. This is generally true initially, however if there is some degradation over time it may be fully or partially corrected by the beam correction system 105.

In exemplary embodiments, the beam diagnostics system 104 may receive the light from the beam sampling system 103 and measure the current wavefront of the laser system 101. Typically the most important parameters of the wavefront to maintain are beam waist location and astigmatism. Astigmatism is effectively a difference in the beam waist location in horizontal and vertical measurement axes. Beam waist location and astigmatism may be measured either directly or indirectly. Typically changes in a laser are slow, so the rate at which the beam diagnostics system 104 measures the wavefront, may also be slow. In embodiments of the invention, corrections may be required less than once per day. However it may be desirable to have the beam diagnostics system 104 measure the wavefront at a rate that is much higher than the rate at which the beam correction system 105 corrects the beam. This allows for the use of averaging, in order to improve system accuracy. It also allows for the use of trend monitoring within the correction cycle. It is also important for the beam sampling system 103 and/or beam diagnostics system 104 to be insensitive to stray light. The beam sampling system 103 preferably samples 1% or less of the light provided from the laser source 102. It is not uncommon for stray light levels within a frequency converted laser to be many times greater than this.

In embodiments of the present disclosure, the beam correction system 105 may correct the wavefront of the laser system 101 based on a measured wavefront provided from the beam diagnostics system 104. This correction may be done in a variety of ways as will be described in detail herein. The location of the beam correction system (ex.—correction optics) 105 within the laser system 101 is important. For instance, correction optics may be placed directly after optical elements that are degrading and must be compensated for. Typically, optical elements that are exposed to light wavelengths less than approximately 400 nanometers (nm) and especially less than 300 nm experience much higher degradation rates compared to wavelengths greater than 400 nm. However, if the correction optics are placed in high power ultraviolet (UV) light, they may also degrade over time. In such cases, it may be desirable for the beam sampling system 103 and the beam diagnostics system 104 to be located after the beam correction system 105, so that degradation in the beam correction system 105 may be fully or partially corrected for. In some embodiments, it may be possible to place the beam correction system 105 before the optical elements that are the primary cause of beam degradation. In such cases, beam correction 105 may be placed in a longer wavelength region to correct for wavefront errors occurring in a shorter wavelength region of laser system 101. This may reduce problems associated with beam degradation to beam correction optics.

Further, more than one beam sampling system 103, beam diagnostics system 104, and/or beam correction system 105 may be used within a single laser system 101. This is especially true if more than one wavelength or beam from a frequency converted laser is used and the wavefront of more than one wavelength or beam must be maintained. Still further, the beam sampling system 103, beam diagnostics system 104, and/or beam correction system 105 may be completely self contained or distributed within laser system 101. It may be desirable to have these systems as self contained as possible for low noise and maintenance, however in a complex laser it is often not practical. It is also important that beam sampling system(s) 103, beam diagnostics system(s) 104, and beam correction system(s) 105 not add significant cost to the laser system 101. In practice, the additional laser lifetime obtained by correcting the laser wavefront can easily compensate for the additional cost and complexity of the beam sampling system 103, beam diagnostics system 104, and beam correction system 105 if implemented as described in this and the following embodiments.

Figure 2:
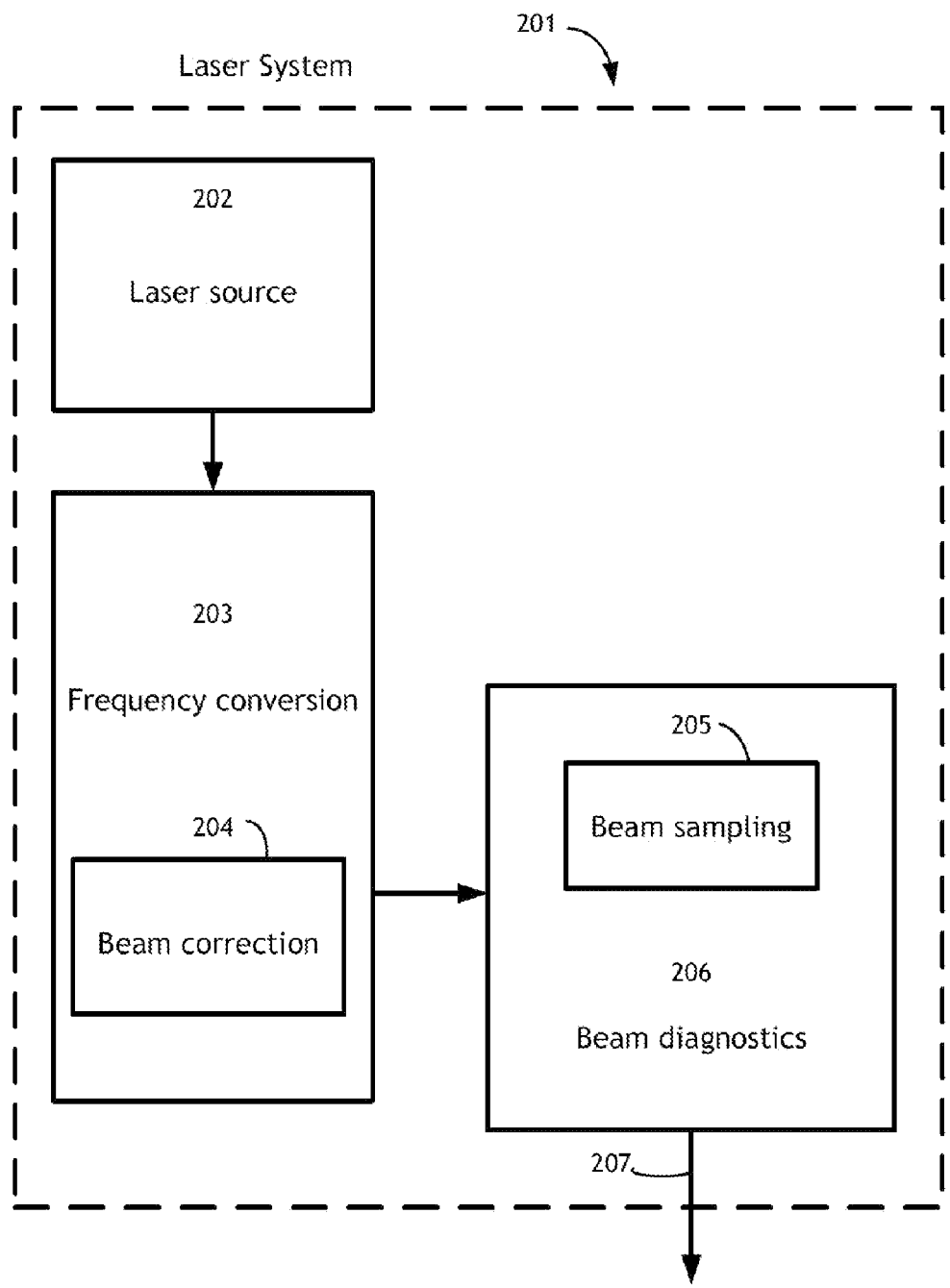
FIG. 2 is a block diagram schematic of a laser system (ex.—frequency converted laser) in accordance with a further exemplary embodiment of the present disclosure, wherein the beam diagnostics module and beam correction module are located external to the frequency conversion module.

Referring to FIG. 2, a block diagram schematic of a laser system (ex.—frequency converted laser) in accordance with a further embodiment of the present disclosure is shown. The laser system 201 includes: a laser source 202; a frequency conversion system 203, the frequency conversion system 203 being connected to the laser source 202; a beam correction system 204, the beam correction system 204 being connected to (ex.—being included as part of) the frequency conversion system 203; a beam sampling 205 system; and a beam diagnostics system 206. Light from the fundamental laser source 202 may be provided to (ex.—may enter) the frequency conversion system 203. Further, the frequency conversion system 203 may produce any harmonic of fundamental light provided from the laser source 202 or may frequency mix light from multiple fundamental sources of the laser source 202. In exemplary embodiments, the beam correction system 204 may be located substantially within the frequency conversion system 203. The beam correction system 204 may be configured for operating directly on light provided from laser source 202, and/or may be configured for operating on any of the harmonics or frequency mixed light produced by frequency conversion system 203.

In embodiments of the present disclosure, the beam correction system 204 may implement a variety of techniques including but not limited to: moving optical elements; changing the temperature of optical elements; and/or deforming the shape of optical elements. In further embodiments, corrected light may be provided from the beam correction system 204 to the beam sampling system 205. A small portion of the corrected light may be separated from the output beam 207 and may be used by the beam diagnostics system 206. The beam sampling system 205 may utilize a variety of techniques including but not limited to: Fresnel reflections; low efficiency diffraction; partially transmitting coatings; and/or reflecting coatings. Further, the beam diagnostics system 206 may use sampled light provided from the beam sampling system 205 to measure desired beam properties. This measuring performed by the beam diagnostics system 206 may use a variety of techniques including but not limited to: wavefront sensors; interferometers; beam profilers; and M-squared (M2) measurements. Measurements made via the beam diagnostics system 206 may be compared to a reference value or a desired value. This comparison information can then be used in a closed loop feedback system to modify the beam correction system 204 for producing the desired wavefront. Typically, the variation of the wavefront happens on a very slow time scale of hours to days. This allows for a lot of averaging in the measurements to take place and very accurate measurement and correction is possible.

Figure 3:
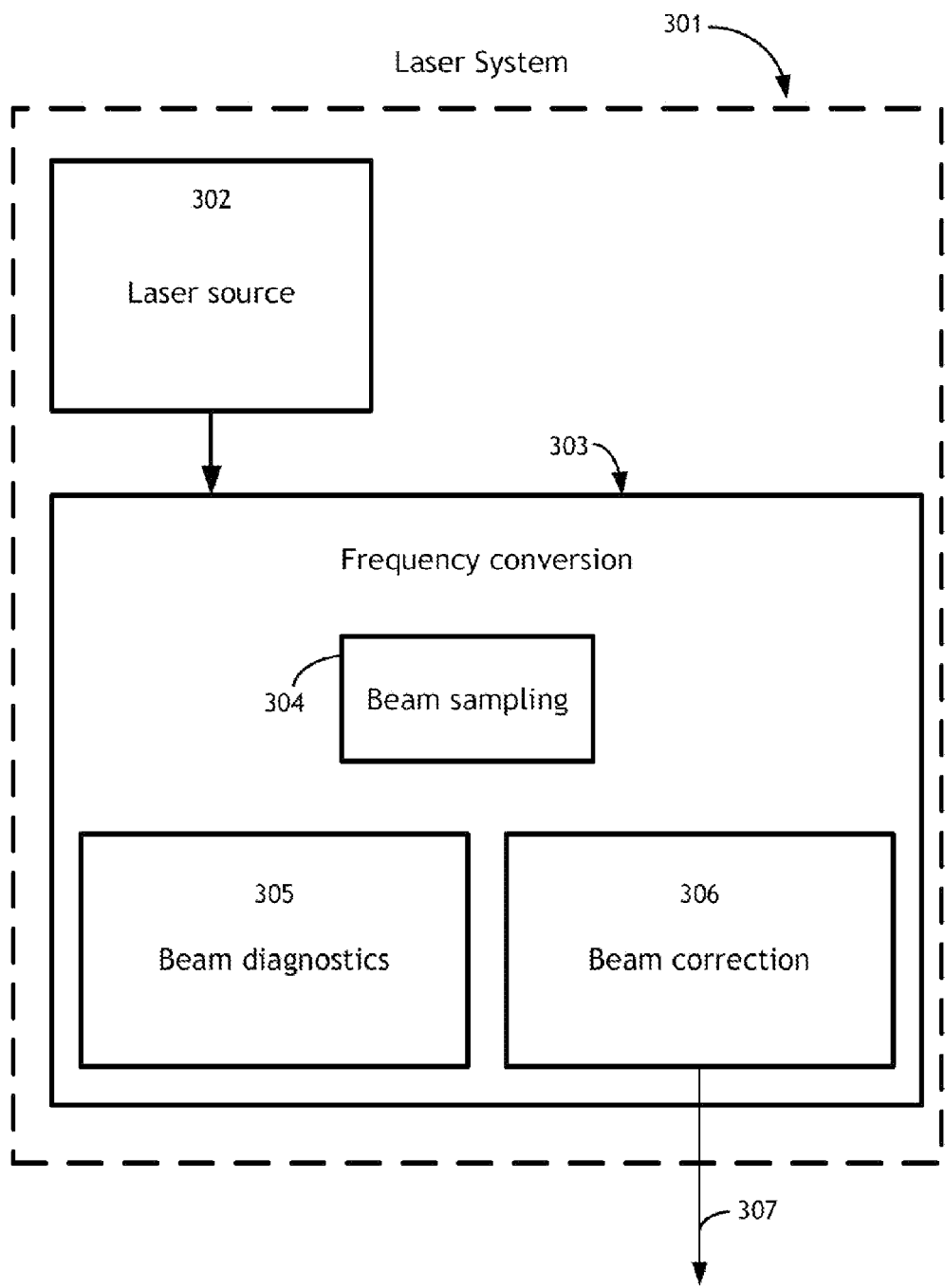
FIG. 3 is a block diagram schematic of a laser system (ex.—frequency converted laser) in accordance with a further exemplary embodiment of the present disclosure, wherein beam diagnostics and beam correction are located substantially within the frequency conversion module.

Referring to FIG. 3, a block diagram schematic of a laser system (ex.—frequency converted laser) in accordance with a further embodiment of the present disclosure is shown. The laser system 301 may include: a laser source 302; a frequency conversion system 303, the frequency conversion system 303 being connected to the laser source 302; a beam sampling system 304, the beam sampling system 304 being connected to (ex.—included in) the frequency conversion system 303; a beam diagnostics system 305, the beam diagnostics system 305 being connected to (ex.—included in) the frequency conversion system 303; and a beam correction system 306, the beam correction system being connected to (ex.—included in) the frequency conversion system 303. In exemplary embodiments, light provided from the fundamental laser source 302 may enter the frequency conversion system 303. The frequency conversion system 303 may produce any harmonic of fundamental light from the laser source 302 or may frequency mix light from multiple fundamental sources within laser source 302. In an embodiment of the invention, the beam correction system 306, beam sampling system 304, and/or beam diagnostics system 305 may be located substantially within frequency conversion system 303.

In further embodiments, the beam correction system 306 may operate directly on light provided from the laser source 302 or may operate on any of the harmonics or frequency mixed light produced by the frequency conversion system 303. The beam correction system 306 may use a variety of techniques including but not limited to: moving optical elements; changing the temperature of optical elements; and deforming the shape of optical elements. The corrected light from the beam correction system 306 may then enter (ex.—be provided to) the beam sampling system 304. A small portion of the corrected light may be separated from the output beam 307 and may be provided to the beam diagnostics system 305. The beam sampling system 304 may use a variety of techniques including but not limited to: Fresnel reflections; low efficiency diffraction; partially transmitting coatings; and/or partially reflecting coatings. The beam diagnostics system 305 may utilize the sampled light provided from the beam sampling system 304 to measure the desired beam properties. This measurement may utilize a variety of techniques including, but not limited to: wavefront sensors; interferometers; beam profilers; and/or M2 measurements. In further embodiments, measurements made via the beam diagnostics system 305 may be compared to a reference value or a desired value. This can then be used in a closed loop feedback system to modify the beam correction system 306 and produce the desired wavefront.

Figure 4:
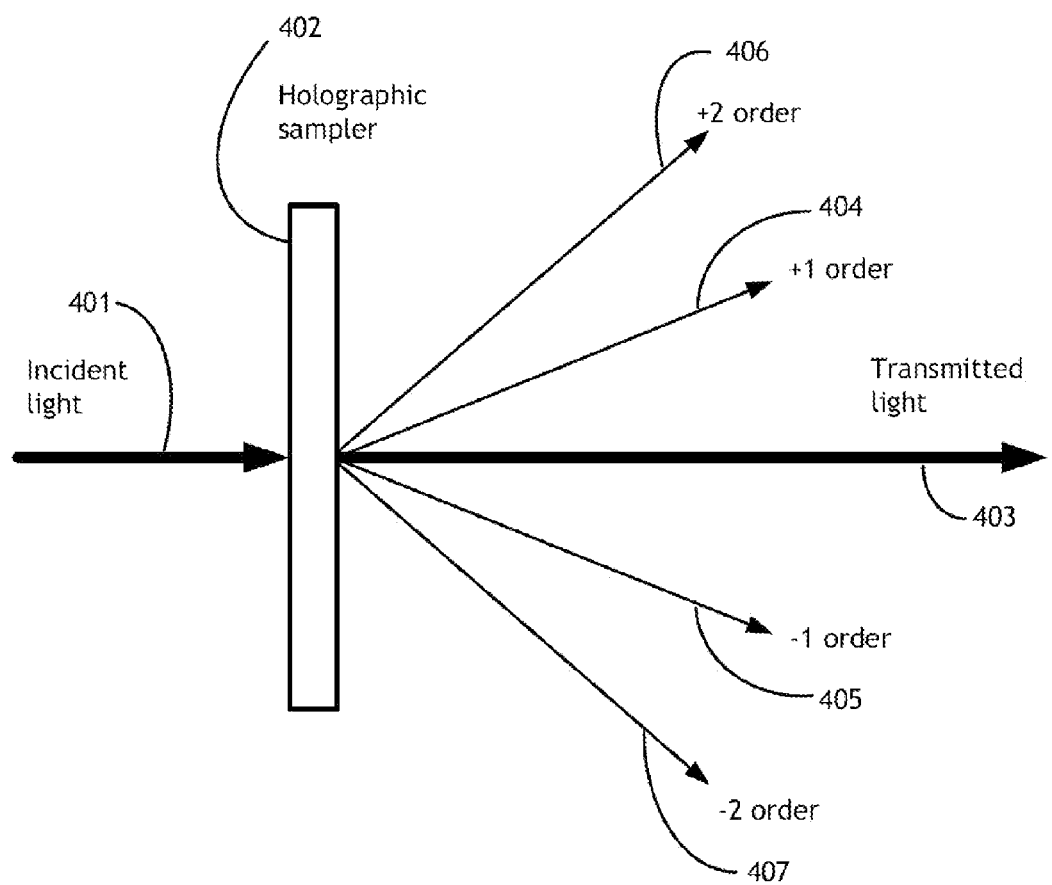
FIG. 4 is a block diagram schematic of an exemplary beam sampling system (ex.—a diffractive beam sampler), which may be implemented in one or more of the laser system embodiments described herein, in accordance with a further exemplary embodiment of the present disclosure.

Referring to FIG. 4, a block diagram schematic of an exemplary beam sampling system (ex.—beam sampler), which may be implemented in one or more of the laser system embodiments described herein, in accordance with a further embodiment of the present disclosure is shown. In the illustrated embodiment of FIG. 4, the beam sampling system (ex.—beam sampler) 402 is configured as a low efficiency diffracting structure (ex.—holographic sampler; diffractive sampler) 402. In FIG. 4, incident light 401 is incident on the diffractive sampler 402. In an embodiment of the present disclosure, one surface of the diffractive sampler (ex.—one surface of a substrate of the diffractive sampler 402) may be anti-reflection coated for a desired wavelength, while another surface of the substrate for the diffractive sampler 402 may contain the diffractive features. In exemplary embodiments, the diffractive features may be arranged so that they provide a desired diffraction angle between diffracted orders. Further, the diffractive features may also be constructed to diffract a specific amount of energy into 1$^{st}$ and higher diffracted orders (404, 405, 406, 407). When implementing a diffractive sampler 402 with a high power laser, less than 1% of the incident energy is required. Typically, the first orders (404 and 405) have the largest portion of the energy, while higher orders (406 and 407) will have substantially less energy than first orders 404 and 405, thereby producing minimal impact on the transmitted light 403.

In still further embodiments, many different types of diffractive structure are possible for this application, however, for the best damage thresholds, it may be desirable to produce the diffractive structure in the surface of the diffractive sampler 402. This may be done by producing a grating structure on a thin film deposited on the substrate for the diffractive sampler 402, and then etching the resulting pattern into the surface. This may produce a high damage threshold diffractive structure directly in fused silica, calcium fluoride, magnesium fluoride, or some other desirable material. In further embodiments, the diffracted orders (404, 405, 406, 407) accurately sample intensity, phase, and polarization. However, the diffracted beam may suffer from anamorphic compression. For light incident normally on the diffractive sampler, the anamorphic compression in the diffraction direction goes as the cosine of the diffracted angle. This effect can be compensated for electronically with any beam profile measurement.

Figure 5:
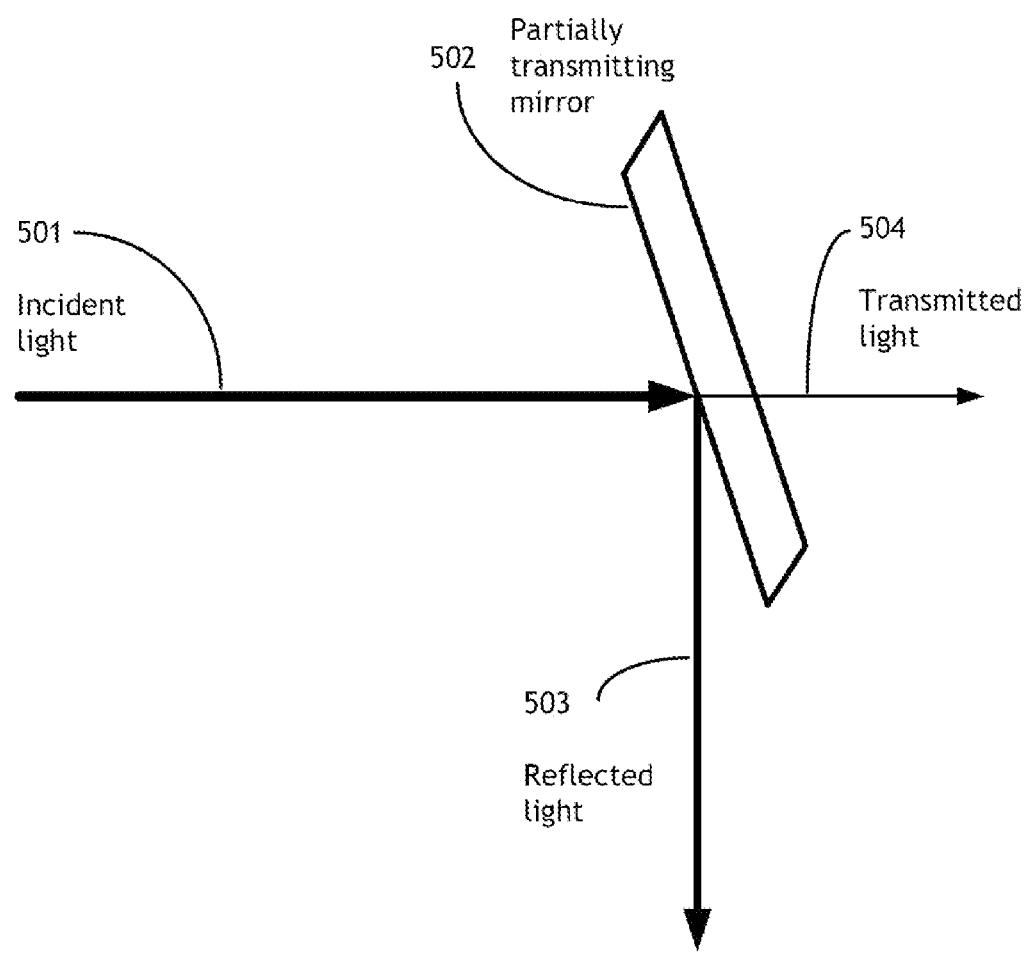
FIG. 5 is a block diagram schematic of an exemplary beam sampling system (ex.—implementing a low transmitting mirror as a beam sampler), which may be implemented in one or more of the laser system embodiments described herein, in accordance with a further exemplary embodiment of the present disclosure.

Referring to FIG. 5, a block diagram schematic of an exemplary beam sampling system (ex.—beam sampler), which may be implemented in one or more of the laser system embodiments described herein, in accordance with a further embodiment of the present disclosure is shown. In the illustrated embodiment of FIG. 5, the beam sampling system (ex.—beam sampler) 502 is configured as a partially transmitting mirror (ex.—low transmitting mirror). In FIG. 5, incident light 501 is incident on the partially transmitting mirror 502. A first surface of the substrate of the partially transmitting mirror 502 may have a coating that allows a desired portion of the incident light 501 for the desired wavelength, while a second surface may or may not have an anti-reflection coating. This may be a very simple mechanism to allow for transmitted light 504 to be provided from (ex.—to be transmitted through; to pass through) the partially transmitting mirror 502, so that beam power and/or beam parameters may be measured, with minimal impact on the reflected light 503. This type of beam sampling may have several drawbacks if it is to be used for measurements that are sensitive to power. Further, small changes in the coating performance of partially transmitting mirror 502 can produce large changes in the transmitted light intensity 504. These changes can be coating damage, photocontamination, or other changes directly affecting the coating such as temperature or humidity. For example, if 1% of the incident light 501 is initially transmitted through the mirror 502 as transmitted light 504, this will leave 99% of the light remaining to be reflected (ex.—reflected light 503). However if the coating changes such that 99.1% of the light is reflected as reflected light 503, while only 0.9% of the light is transmitted as transmitted light 504, the result is a 10% change in light level of transmitted light 504 and only 0.1% change in reflected light 503. In addition, when implementing a beam sampling system (ex.—beam sampler) 502 which is a partially transmitting mirror, sensitivity to small changes in incident polarization may be a factor. This may be due to the fact that optical coatings typically perform differently with different polarizations when the angle of incidence of the incident light 501 relative to the partially transmitting mirror 502 is greater than twenty degrees. For this reason, it is desirable to use this type of beam sampling at as low an incident angle as possible.

Figure 6:
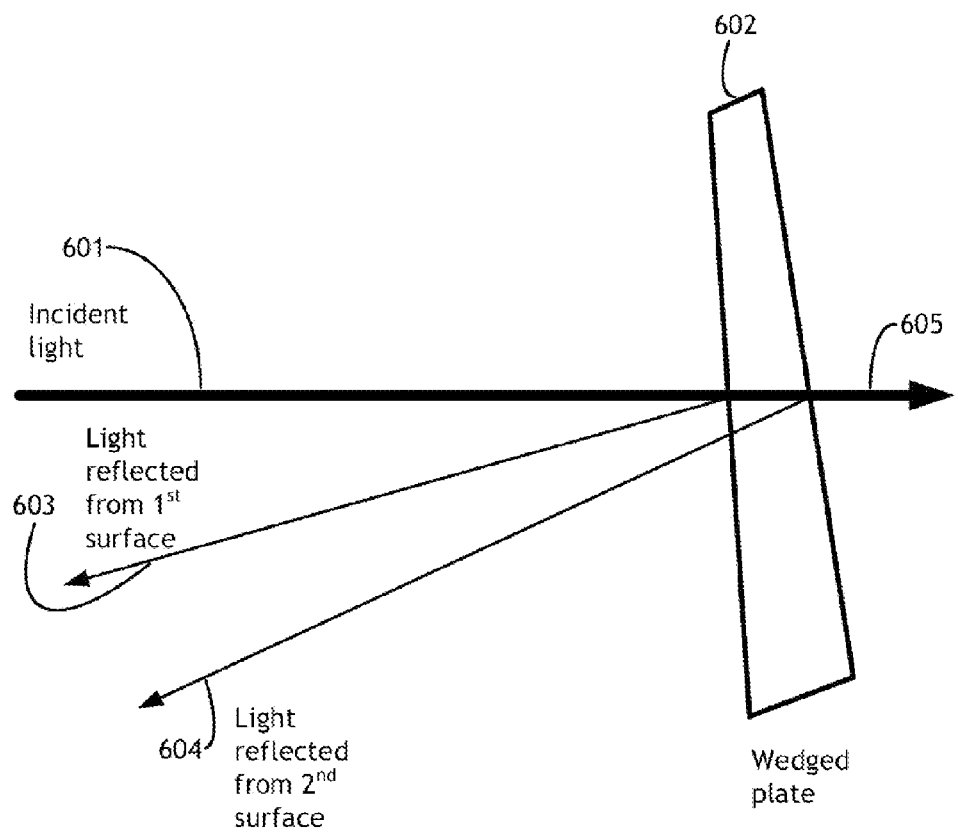
FIG. 6 is a block diagram schematic of an exemplary beam sampling system (ex.—implementing a low reflection surface as a beam sampler), which may be implemented in one or more of the laser system embodiments described herein, in accordance with a further exemplary embodiment of the present disclosure.

Referring to FIG. 6, a block diagram schematic of an exemplary beam sampling system (ex.—beam sampler), which may be implemented in one or more of the laser system embodiments described herein, in accordance with a further embodiment of the present disclosure is shown. In the illustrated embodiment of FIG. 6, the beam sampling system (ex.—beam sampler) 602 is configured as low reflection surface(s) (ex.—wedged plate) 602. In FIG. 6, incident light 601 is incident on the low reflection surface(s) 602. In exemplary embodiments, a first portion 603 of the incident light 601 reflects off of a first surface of the beam sampler 602, a second portion 604 of the incident light 601 reflects off of a second surface of the beam sampler 602, while a third portion (ex.—remaining portion) 605 of the incident light is transmitted through the beam sampler 602.

In further embodiments, one or more surfaces of the beam sampler (ex.—surfaces of a substrate forming the beam sampler 602) may either be uncoated, or said surfaces may have a coating to reduce the reflectivity further. Uncoated surfaces are good options because of their high damage threshold. However, the reflectivity when implementing a beam sampler 602 with uncoated surfaces may be higher than is desirable. For example, when the incident light 601 contacts the beam sampler 602 at a near zero degree angle of incidence, if the beam sampler 602 is implementing uncoated surface(s), there may be about 4% reflection per surface. Thus, two uncoated surfaces of the beam sampler 602 may reduce the transmitted light 605 by 8% over the incident light 601. In further embodiments, it may be possible to use an anti-reflection coating on the second surface of the beam sampler 602 to limit the total reflections to 4%, however, this is still a significant amount of light. In still further embodiments, if the uncoated surface is oriented close to Brewster's angle, a P-polarized portion of the incident light 601 may experience much less reflectivity. However this technique of reducing the light 603 reflected from the first surface and the light 604 reflected from the second surface may be sensitive to polarization changes in the incident light 601. S-polarized reflection from a surface near Brewster's angle may be around 14%. If a coating is used on surface(s) of the beam sampler 602, it should allow a desired portion of the incident light 601 to reflect off of the first surface and/or second surface for the desired wavelength. In further embodiments, the second surface of the beam sampler 602 may or may not have an anti-reflection coating.

Figure 7:
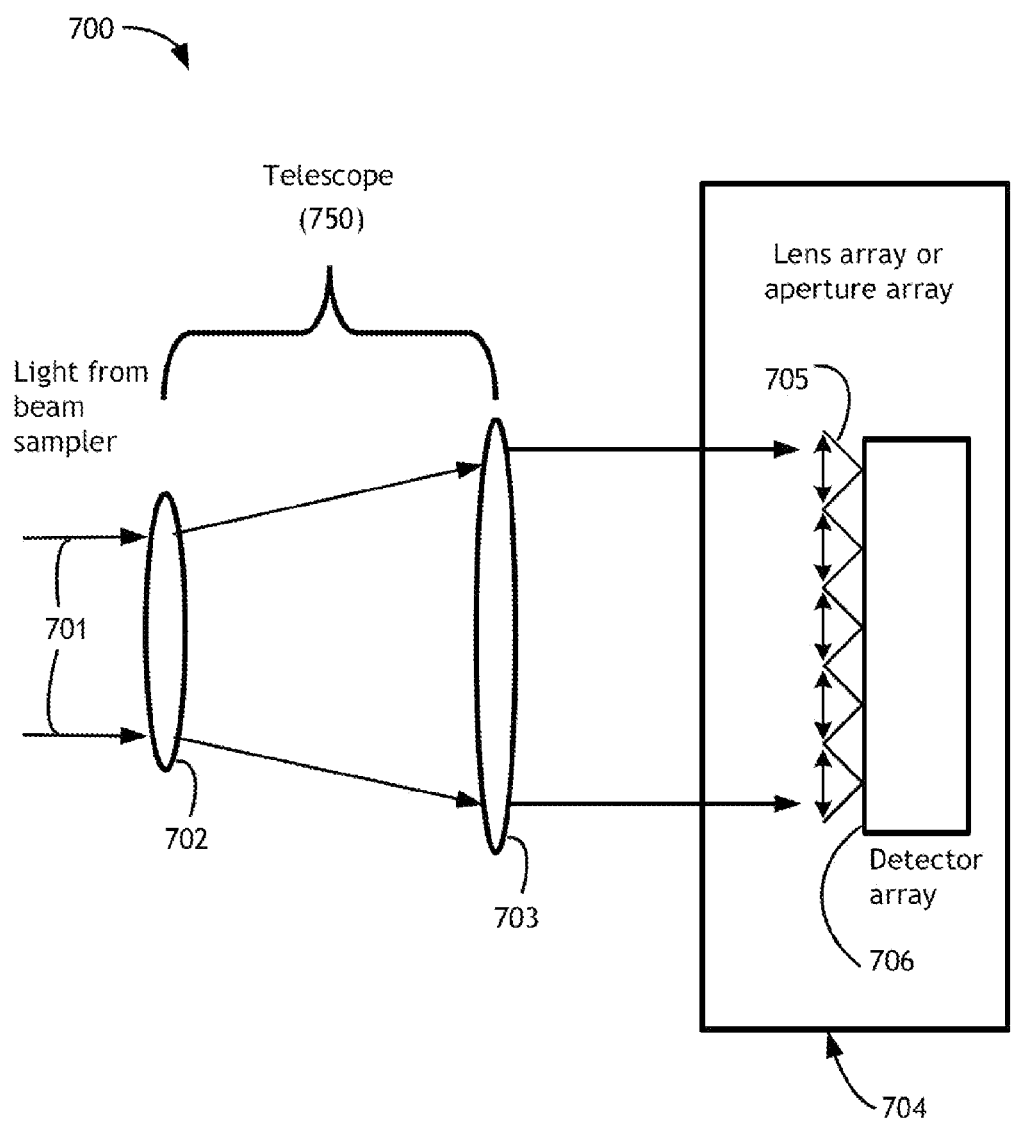
FIG. 7 is a block diagram schematic of an exemplary beam diagnostics system (ex.—a wavefront sensor used for beam diagnostics), which may be implemented in one or more of the laser system embodiments described herein, in accordance with a further exemplary embodiment of the present disclosure.

Referring to FIG. 7, a block diagram schematic of an exemplary beam diagnostics system, which may be implemented in one or more of the laser system embodiments described herein, in accordance with a further embodiment of the present disclosure is shown. The beam diagnostics system 700 may be configured for measuring wavefront and beam profile and may include a telescope 750 having a first lens 702 and a second lens 703. The beam diagnostics system 700 may further include a wavefront and beam profile detector 704, said wavefront and beam profile detector 704 being operatively coupled with the telescope 750. In FIG. 7, incident light (ex.—light provided via a beam sampler) 701 may pass through the lenses (702, 703) of the telescope 750.

In exemplary embodiments, the telescope 750 may be used to expand the beam of incident light 701 so as to obtain suitable spatial resolution on the wavefront and beam profile detector (ex.—wavefront measurement device; wavefront measuring device) 704. The telescope 750 may also be utilized for setting the focus of the wavefront to a reference value that is within a range of measurement of the wavefront measuring device 704. Variations from this reference setting may indicate changes in the beam wavefront or spatial intensity profile. The telescope 750 may also be designed using a different arrangement of lenses or mirrors. In further embodiments, the telescope 750 may be omitted if the beam parameters of the incident light (ex.—light from the beam sampler) 701 already meet the desired requirements. After light exits the telescope 750, it may enter the wavefront and beam profile detector 704. In the embodiment illustrated in FIG. 7, the wavefront and beam profile detector 704 may be a wavefront sensor. However, in further embodiments, the wavefront and beam profile detector 704 may be and/or may include an interferometer or other device. In the embodiment illustrated in FIG. 7, the wavefront sensor 704 includes a lens array (ex.—aperture array) 705 and a detector array 706.

In embodiments of the present disclosure, the lens array 705 may be configured for receiving the light 701, which may be provided to the beam diagnostics system 700 via a beam sampler and may be provided to the lens array 705 via the telescope 750. The lens array 705 may be configured for effectively creating an array of spots on the detector array 706 based upon the received light 701. Variations in the positions of these spots may be used to calculate a beam wavefront produced by the laser system implementing the beam diagnostics system 700. An intensity distribution of these spots also provides a measure of the beam intensity profile. In exemplary embodiments, the wavefront sensor 704 may provide an almost real time measurement of the laser beam parameters.

Figure 8:
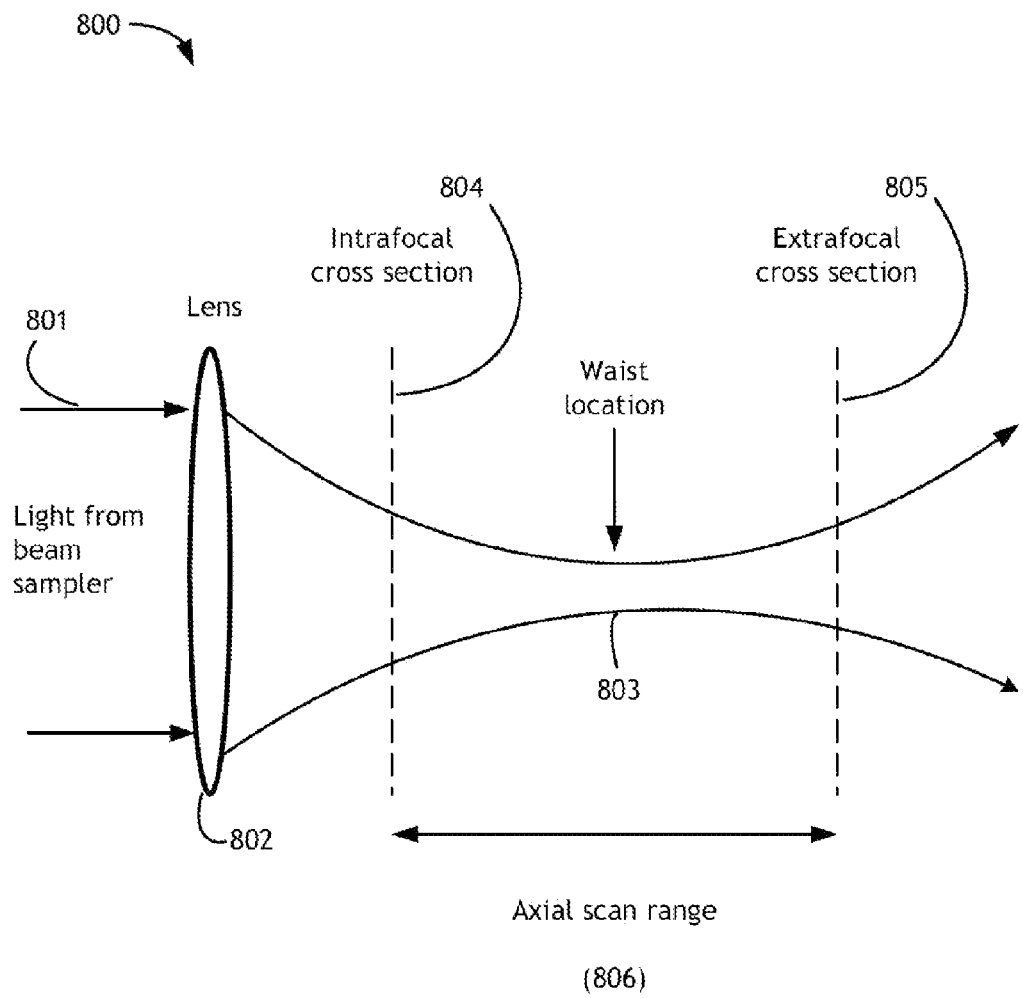
FIG. 8 is a block diagram schematic of an exemplary beam diagnostics system (ex.—a M2 measurement system used for beam diagnostics), which may be implemented in one or more of the laser system embodiments described herein, in accordance with a further exemplary embodiment of the present disclosure.

Referring to FIG. 8, a block diagram schematic of an exemplary beam diagnostics system, which may be implemented in one or more of the laser system embodiments described herein, in accordance with a further embodiment of the present disclosure is shown. In exemplary embodiments, the beam diagnostics system 800 includes a focusing lens 802. The beam diagnostics system 800 receives light 801 (ex.—the light 801 may be provided to the beam diagnostics system 800 from a beam sampler). The received light 801 may be directed through the focusing lens 802, such that said light focuses to form a beam waist 803. In further embodiments, the beam diagnostics system 800 is configured for utilizing (ex.—measuring) a beam profile of the focused light at a plurality of different locations along an axial scan range 806. In exemplary embodiments, one or more of the following may be implemented for measuring the beam profile: a scanning slit; a scanning knife edge; a scanning pinhole; and/or an array detector. Further, the beam profile may be measured at various positions along the axial scan range 806, said axial scan range including intrafocal cross sections 804 and extrafocal cross sections 805. For instance, the axial locations of the cross sections, the measured 4 sigma cross section diameters, and the wavelength of the incident light 801 may be used to accurately calculate the beam quality value M2, and the location of the beam waist 803 in the vertical and horizontal axis. Measured changes in the size and/or location of the beam waist 803 may then be used to feed back to a beam correction system, such as described in one or more of the embodiments disclosed herein.

Figure 9:
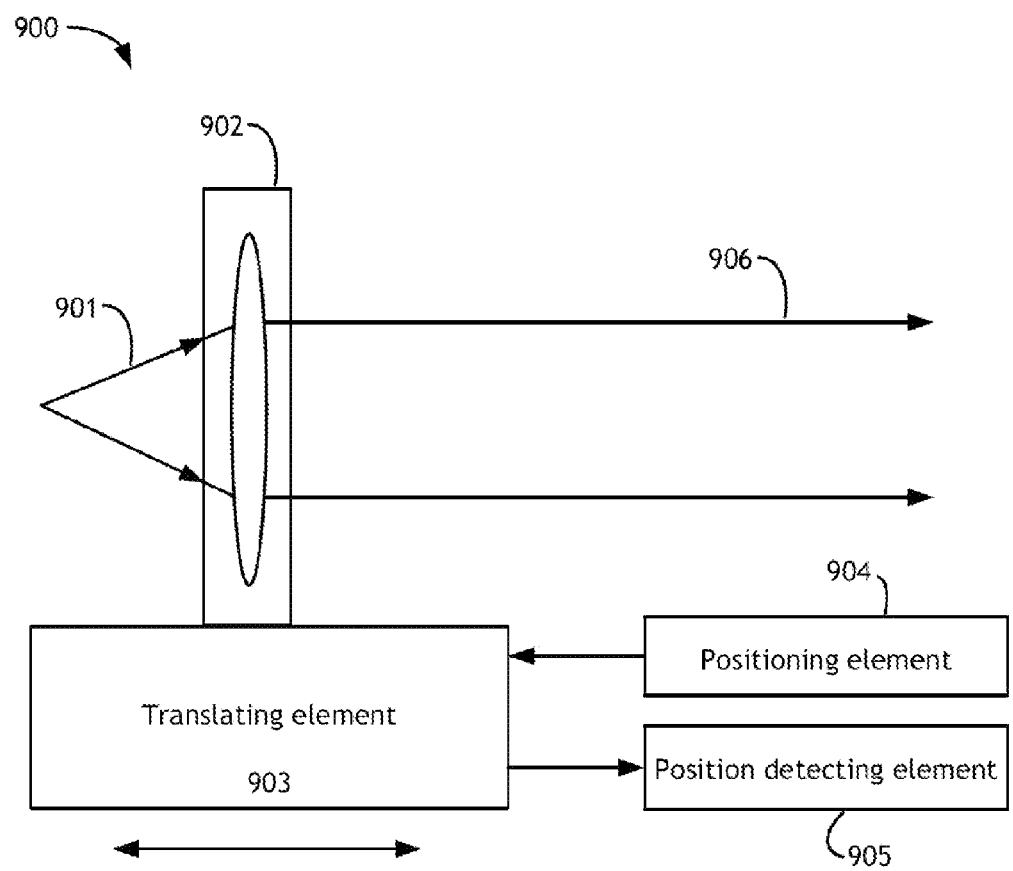
FIG. 9 is a block diagram schematic of an exemplary beam correction system, which may be implemented in one or more of the laser system embodiments described herein, in accordance with a further exemplary embodiment of the present disclosure, wherein the beam correction system implements shifting of a lens to correct for changes in laser focusing.

Referring to FIG. 9, a block diagram schematic of an exemplary beam correction system, which may be implemented in one or more of the laser system embodiments described herein, in accordance with a further embodiment of the present disclosure is shown. In exemplary embodiments, the beam correction system 900 may include: a lens system 902; a translating element 903, the translating element 903 being connected to (ex.—operatively coupled with) the lens system 902; a positioning element 904, the positioning element 904 being connected to (ex.—operatively coupled with) the translating element 903; and a position detecting element 905, the position detecting element 905 being connected to (ex.—operatively coupled with) the translating element 903.

In embodiments of the present disclosure, the beam correction system 900 may be configured for receiving light 901. In further embodiments, the light 901 may pass through the lens system 902. For example, the light 901 may be diverging, converging or nearly collimated. In the illustrated embodiments, the lens system 902 may be configured for causing the light 901 to be mostly collimated light 906 after it passes through the lens system 902. In further embodiments, the lens system 902 may be configured for causing the exiting light 906 to be diverging or converging. In still further embodiments, the lens system 902 may include a single lens element (ex.—lens) or more than one lens element.

In exemplary embodiments of the present disclosure, the lens system 902 may be configured (ex.—placed or positioned) upon the translating element 903. Further, the translating element 903 may be configured for being accurately positioned by utilizing the positioning element 904. In further embodiments, the position detecting element 905 may be utilized for accurately determining the position of the translating element 903. For example, the position detecting element 905 may be connected to the translating element 903 and the positioning element 904 via a closed loop circuit for accurately setting (ex.—shifting) and maintaining the position of translating element 903.

In further embodiments, the lens element(s) of the lens system 902 may have spherical surface(s), may be cylindrical element(s), or may have aspheric surface(s). In exemplary embodiments, the translating element 903 is configured for being moved to adjust beam parameters measured by a beam diagnostics system as shown in other embodiments. Translating an on-axis spherical element of the lens system 902 along the axis may adjust wavefront power. Translating an on-axis cylindrical element of the lens system 902 along the axis may adjust wavefront astigmatism. Translating an aspheric element of the lens system 902 may adjust higher order wavefront aberrations. It is also possible to adjust a lateral position of an element of the lens system 902 to adjust coma and the rotation of an element of the lens system 902 to adjust astigmatism.

Figure 10:
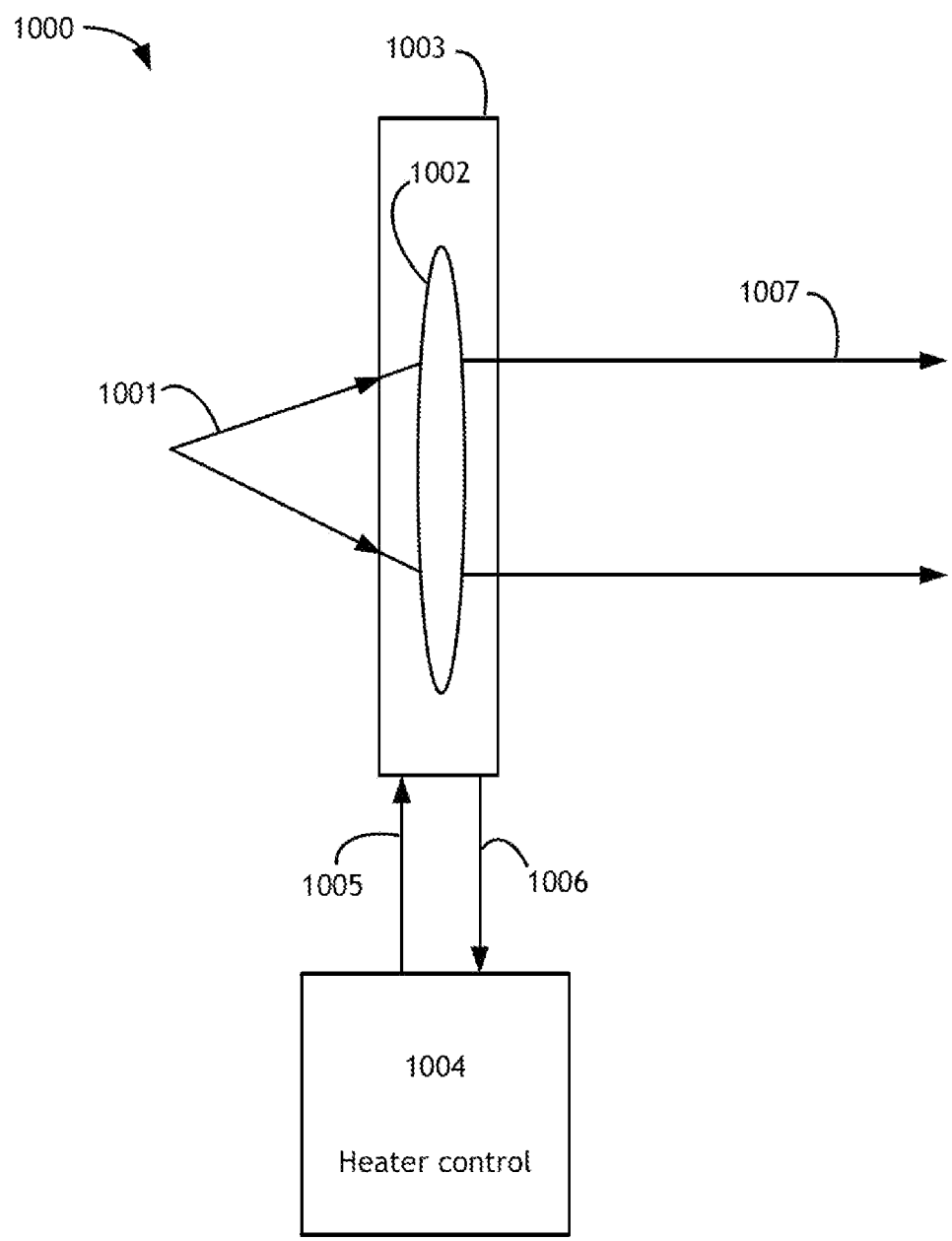
FIG. 10 is a block diagram schematic of an exemplary beam correction system, which may be implemented in one or more of the laser system embodiments described herein, in accordance with a further exemplary embodiment of the present disclosure, wherein the beam correction system implements changing of lens temperature to correct for changes in laser focusing.

Referring to FIG. 10, a block diagram schematic of an exemplary beam correction system, which may be implemented in one or more of the laser system embodiments described herein, in accordance with a further embodiment of the present disclosure is shown. In exemplary embodiments, the beam correction system 1000 may include: a heating element 1003; a lens element (ex.—lens) 1002, the lens element 1002 being operationally coupled with (ex.—in proximity to) the heating element 1003; a heater control 1004, the heater control 1004 being connected to (ex.—operationally coupled with) the heating element 1003 and the lens element 1002.

In exemplary embodiments of the present disclosure, the beam correction system 1000 may be configured for receiving light 1001. In further embodiments, the light 1001 (ex.—diverging light; converging light; nearly collimated light) may pass through the lens element 1002. The lens element 1002 may be configured such that the light 1001 which passes through the lens element 1002 may exit the lens element 1002 as light 1007 which is mostly collimated, diverging, or converging. In further embodiments, the beam correction system 1000 may implement more than one lens element 1002.

As mentioned above, the lens element 1002 may be in proximity to the heating element 1003. Further, the heating element 1003 may be controlled using the heater control 1004. In exemplary embodiments, the heater control 1004 is configured for sensing (via feedback 1006 received from the heating element) a temperature of the heating element 1003. Further, based upon said received feedback 1006, the heater control 1004 may modify an amount of power 1005 it supplies to the heating element 1003, thereby modifying the temperature of the heating element 1003. Still further, as the temperature of the heating element 1003 changes, a temperature of the lens element 1002 changes. Changing the temperature of the lens element 1002 effectively changes the index, thickness, and curvature of the lens element 1002, thereby promoting a change in the wavefront. In exemplary embodiments, the lens element 1002 may be configured as an on-axis spherical element aligned with the light 1001 along an axis for adjusting the power of the wavefront. In further embodiments, the lens element 102 may be configured as an on-axis cylindrical element aligned along an axis for adjusting an astigmatism of the wavefront. Other examples of correction are possible using temperature to affect the resulting wavefront of the emerging light 1007.

Figure 11:
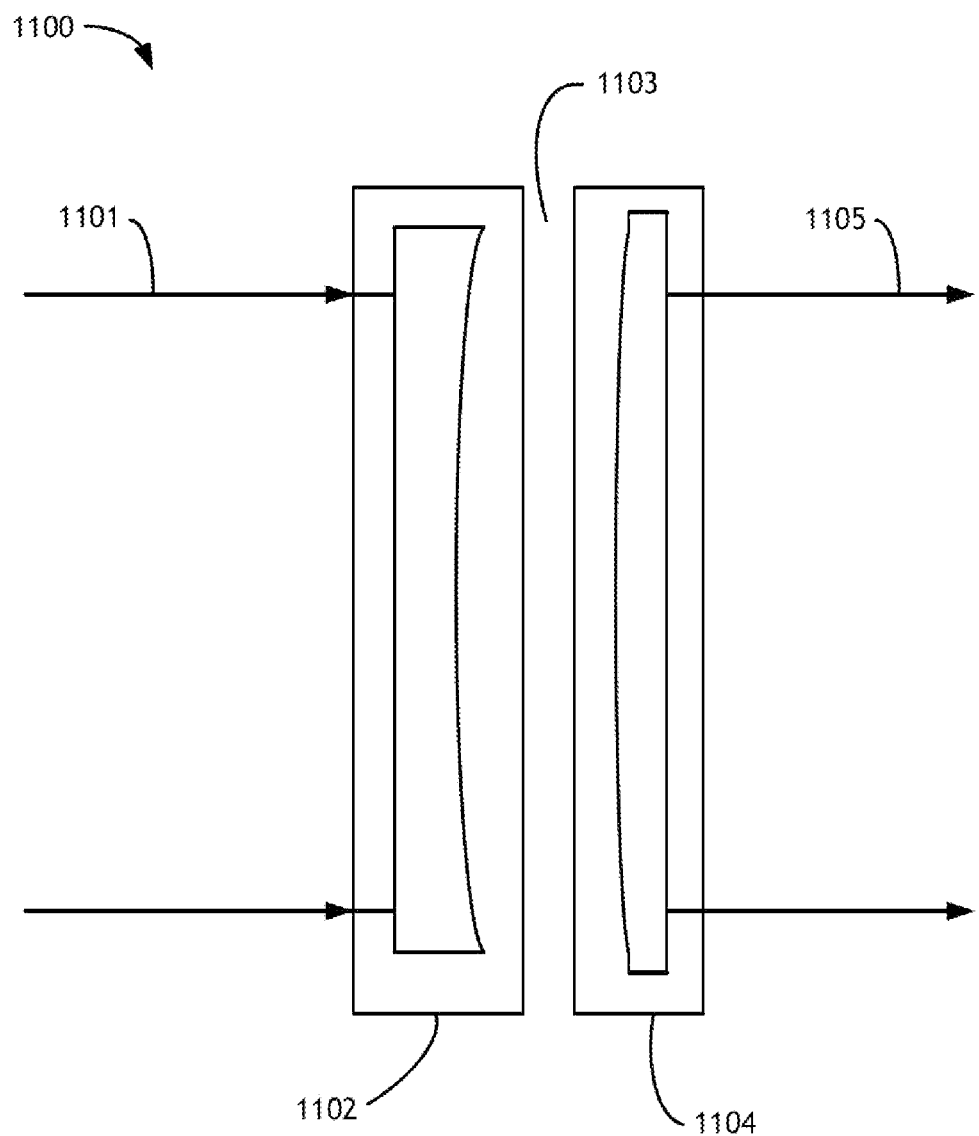
FIG. 11 is a block diagram schematic of an exemplary beam correction system, which may be implemented in one or more of the laser system embodiments described herein, in accordance with a further exemplary embodiment of the present disclosure, wherein the beam correction system implements changing of spacing between closely spaced lenses to correct for changes in laser focusing.

Referring to FIG. 11, a block diagram schematic of an exemplary beam correction system, which may be implemented in one or more of the laser system embodiments described herein, in accordance with a further embodiment of the present disclosure is shown. In exemplary embodiments, the beam correction system 1100 may include: a first lens element (ex.—a first lens) 1002; and a second lens element (ex.—a second lens) 1004, the lens elements (1002, 1004) being in proximity to each other, but being spaced apart from each other by a variable distance 1003. In embodiments of the present disclosure, the beam correction system 1100 is configured for receiving incoming light (ex.—nearly collimated light, diverging light, or converging light) 1101. The lens elements (1102, 1104) are configured for allowing the incoming light 1101 to pass through the first lens element 1102, to pass through the second lens element 1104, and to emerge from the second lens element 1104 as exiting light (ex.—diverging light, converging light, or nearly collimated light) 1105.

In further embodiments, the combination of lens elements (1102, 1104) produces nearly zero net power. Changing the distance (ex.—spacing) 1103 between the elements (1102, 1104) may change the power of the light 1105 exiting lens element 1104. For example, the spacing 1103 may be changed by a variety of methods and/or mechanisms, such as: piezoelectric elements, motor drive elements, or temperature control elements.

In exemplary embodiments, the lens elements (1102, 1104) may be configured as on-axis spherical elements aligned with the light 1101 along an axis for adjusting power of the wavefront. In further embodiments, the lens elements (1102, 1104) may be configured as on-axis spherical elements aligned with the light 1101 along an axis for adjusting astigmatism of the wavefront. Still further, other examples of correction are possible using variable spacing between lens elements placed in proximity to each other to modify the resulting wavefront of the emerging light 1105.

Figure 12:
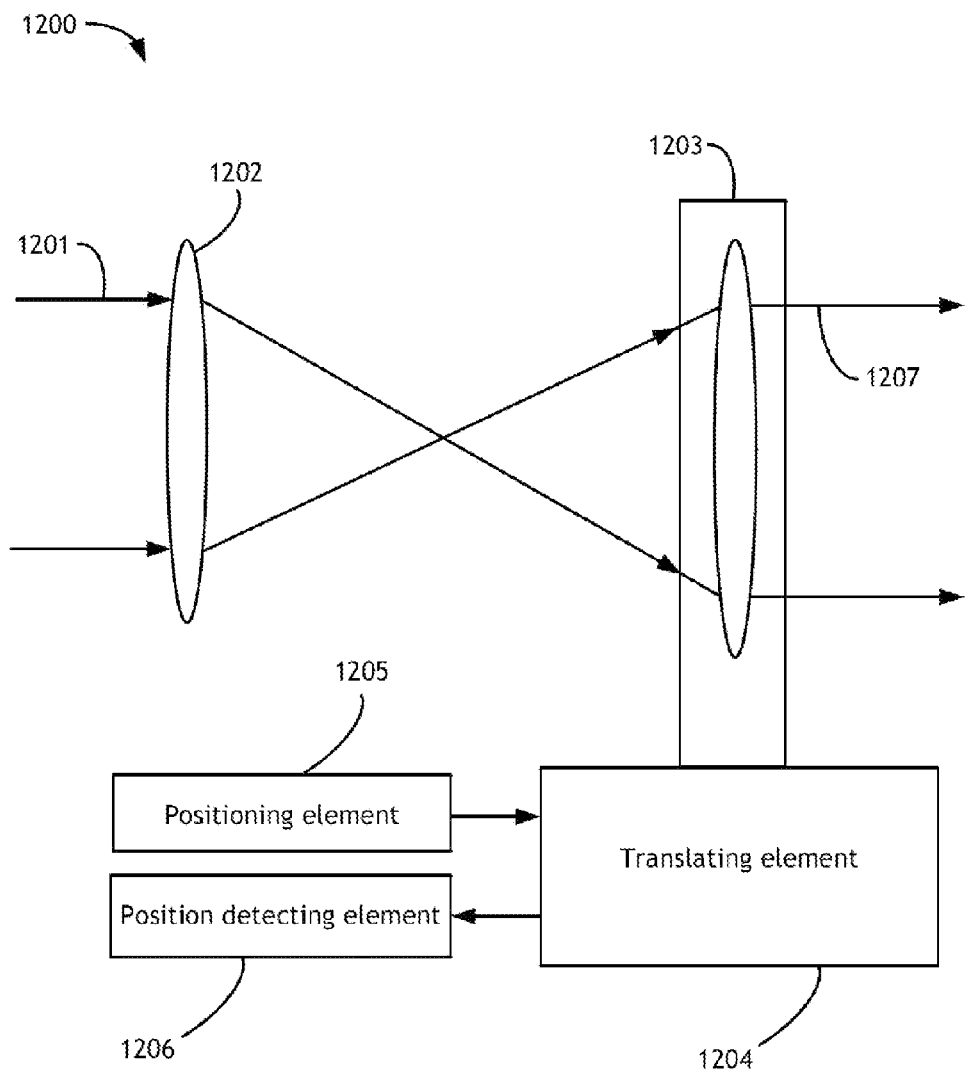
FIG. 12 is a block diagram schematic of an exemplary beam correction system, which may be implemented in one or more of the laser system embodiments described herein, in accordance with a further embodiment of the present disclosure, wherein the beam correction system implements changing of the collimation state of widely separated lenses.

Referring to FIG. 12, a block diagram schematic of an exemplary beam correction system, which may be implemented in one or more of the laser system embodiments described herein, in accordance with a further embodiment of the present disclosure is shown. In exemplary embodiments of the present disclosure, the beam correction system 1200 may include a first lens element (ex.—a first lens) 1202 and a second lens element 1203, the lens elements (1202, 1203) being operationally coupled with each other. In further embodiments, the beam correction system 1200 is configured for receiving incoming light 1201. For example, the incoming light 1201 may be diverging light, converging light, or nearly collimated light. In still further embodiments, the received light 1201 may pass through the first lens element 1202. Further, after passing through the first lens element 1202, the light 1201 may be directed through a focus, and then may be collected by the second lens element 1203. In alternative embodiments, the light 1201 may pass through the first lens element 1202 and may be directed to the second lens element 1203 without being directed through a focus. The light 1201 may then pass through (ex.—may exit) the second lens element 1203 as exiting light 1207. For instance, the exiting light 1207 may be diverging light, converging light, or nearly collimated light.

In exemplary embodiments, the combination of lens elements (1202, 1203) may produce nearly zero net power. Changing the spacing between the elements (1202, 1203) may change the power of the exiting light 1207. In further embodiments, the second lens element 1203 may be connected to (ex.—mounted on) a translating element 1204 of the beam correction system 1200. A positioning element 1205 of the beam correction system 1200 may be connected to the translating element 1204. Further, a position detecting element 1206 may be connected to the translating element 1204 and the positioning element 1205. A position of the second lens element 1203 (ex.—relative to the first lens element 1202) may be established, changed, and/or controlled via the translating element 1204, positioning element 1205 and position detecting element 1206, the translating element 1204, positioning element 1205 and position detecting element 1206 being operationally coupled via a closed feedback loop. The positioning element 1205 and translating element 1204 may implement a variety of methods and/or mechanisms including: piezoelectric elements, motor drive elements, temperature control elements, and/or translation stages. As in previous examples discussed above, the optical elements (1202, 1203) may be on-axis spherical elements aligned with the light 1201 along an axis and may be configured for adjusting the power of a wavefront. Alternatively, the optical elements (1202, 1203) may be on-axis cylindrical elements aligned with the light 1201 along an axis and may be configured for adjusting an astigmatism of the wavefront. In further embodiments, other mechanisms implementing variable spacing between lens elements placed in proximity to each other may be utilized for providing correction to (ex.—modifying) a resulting wavefront of the emerging light 1207.

Figure 13:
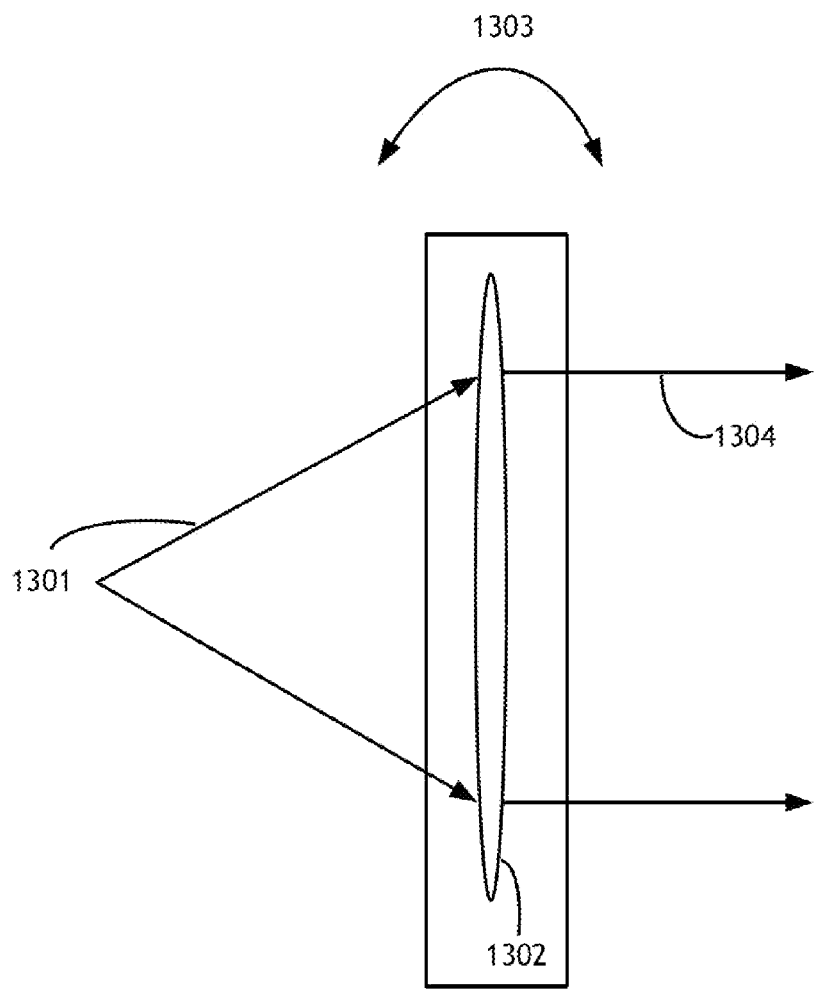
FIG. 13 is a block diagram schematic of an exemplary tilting optical element (ex.—tilt lens element; tilt lens) for use in one or more of the beam correction system embodiments described herein, in accordance with a further exemplary embodiment of the present disclosure, wherein the lens may be adjustably tilted for promoting beam astigmatism correction.

Referring to FIG. 13, a block diagram schematic of an exemplary tilting optical element (ex.—tilt lens element; tilt lens) for use in one or more of the beam correction system embodiments described herein, in accordance with a further embodiment of the present disclosure is shown. In exemplary embodiments of the present disclosure, the tilt lens element 1302 may be configured for allowing incoming light 1301 (ex.—diverging light, converging light, or nearly collimated light) to pass through the tilt lens element 1302. The tilt lens element 1302 may further be configured, such that when the incoming light 1301 passes through the tilt lens element 1302 and exits the tilt lens element 1302 as exiting light 1304, the exiting light 1304 may be diverging light, converging light, or nearly collimated light. For example, in the illustrated embodiment shown in FIG. 13, the incoming light 1301 is diverging, while the exiting light 1304 is nearly collimated. In further embodiments, more than one tilt lens element 1302 may be implemented in one or more of the beam correction system embodiments described herein.

In exemplary embodiments of the present disclosure, the optical element 1302 may be configured for being tilted through a range of various angles (as shown by reference numeral 1303) for modifying an astigmatism of a wavefront of the exiting light 1304. As in previous examples discussed above, the tilt optical element 1302 (when not tilted) may be an on-axis spherical element which is initially aligned with the incoming light 1301 along an optical axis. Alternatively, optical element 1302 may also have cylindrical surfaces or other aspheric shape(s). Further, the tilt lens 1302 may be tilted along the range of angles for modifying a resulting wavefront of the emerging light 1304.

Figure 14:
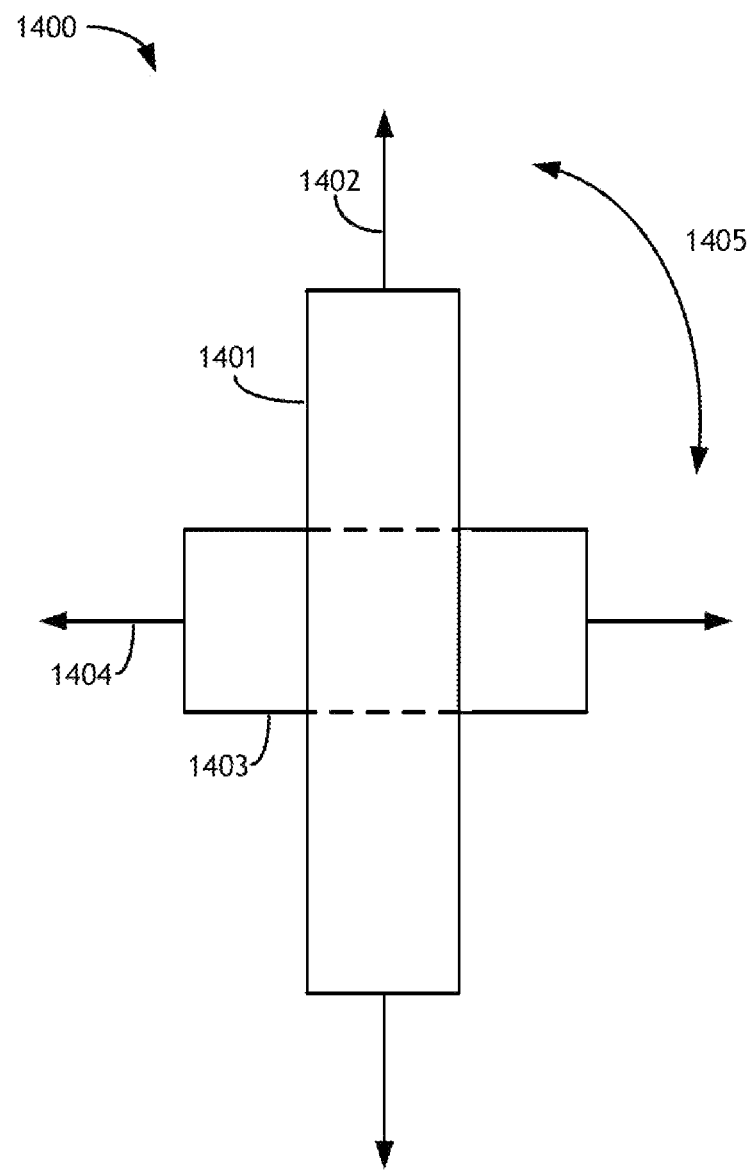
FIG. 14 is a block diagram schematic of an exemplary tilting optical element system for use in one or more of the beam correction system embodiments described herein, in accordance with a further exemplary embodiment of the present disclosure, wherein said optical element system implements rotatable lenses for providing beam astigmatism correction.

Referring to FIG. 14, a block diagram schematic of an exemplary tilting optical element system for use in one or more of the beam correction system embodiments described herein, in accordance with a further embodiment of the present disclosure is shown. In exemplary embodiments, the tilting optical element system 1400 may include a first optical element 1401 and a second optical element 1403. For example, the first optical element 1401 and the second optical element 1403 may each include cylindrical surfaces. In further embodiments, the first and second optical elements (1401, 1403) may be configured for allowing light to pass through them. In the illustrated embodiment, the light is not shown, but may be visualized as propagating into or out of the page on which FIG. 14 appears. In a first configuration, the first optical element 1401 may be in a perpendicular orientation relative to the second optical element 1403. For example, in the first configuration, the cylindrical structure of the first optical element 1401 may be aligned along a first axis 1402, while the cylindrical structure of the second optical element may be aligned along a second axis 1404, the first axis 1402 being orthogonal to the second axis 1404.

In exemplary embodiments, when the first optical element 1401 and the second optical element are in the relative orthogonal alignment shown in FIG. 14, no net astigmatism is induced in the light that passes through the optical elements (1401, 1403). However, if one (or both) of the optical elements, such as the second tilt optical element 1403, is a tilt optical element 1403 and is rotated relative to the first optical element 1401 through angle (ex—rotation path) 1405 (as shown in FIG. 14), a net astigmatism in the wavefront may increase until a maximum astigmatism is achieved (ex.—at a point when the second optical element 1403 has moved into a parallel orientation relative to the first optical element 1401).

Figure 15:
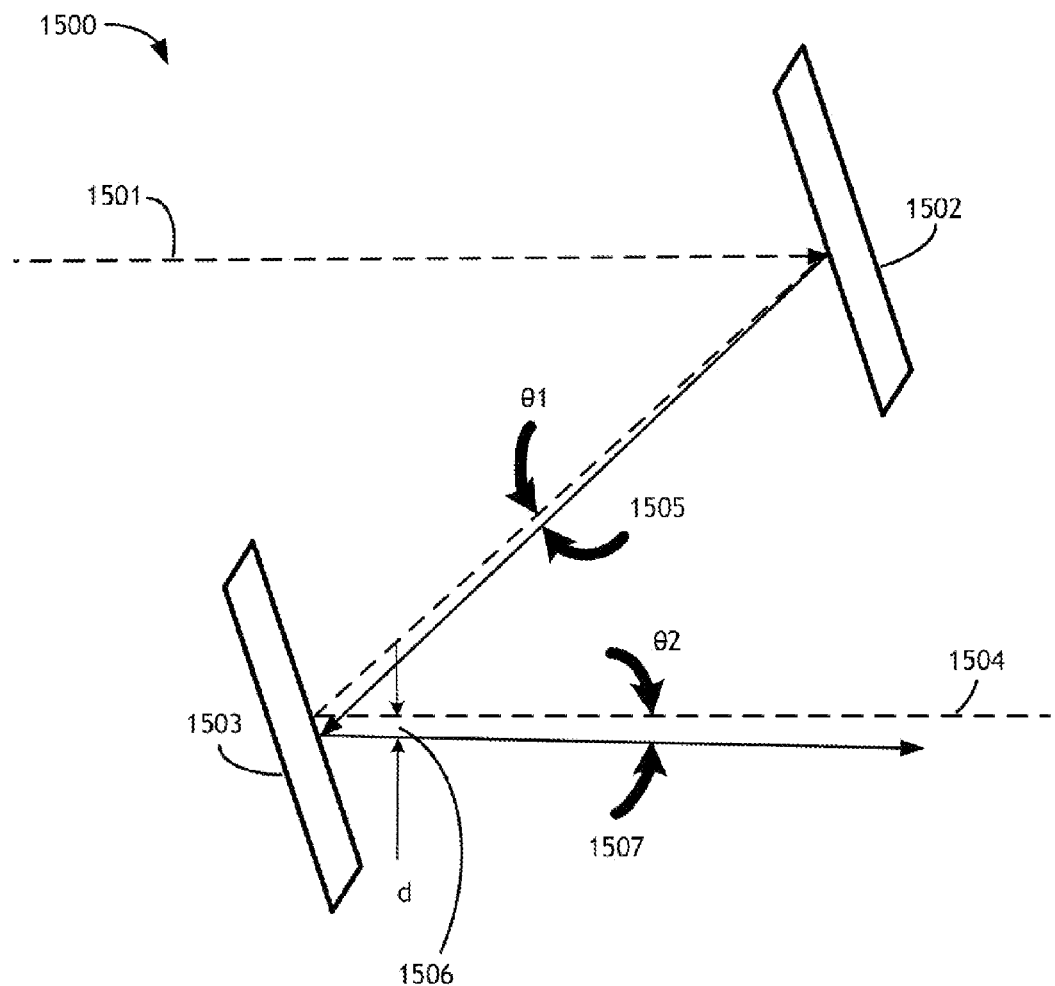
FIG. 15 is a block diagram schematic of an exemplary beam correction system, which may be implemented in one or more of the laser system embodiments described herein, in accordance with a further exemplary embodiment of the present disclosure, wherein the beam correction system implements beam tilt and de-center correction using two mirrors.

Referring to FIG. 15, a block diagram schematic of an exemplary beam correction system, which may be implemented in one or more of the laser system embodiments described herein, in accordance with a further embodiment of the present disclosure is shown. In exemplary embodiments, the beam correction system 1500 may implement a first mirror element 1502 and a second mirror element 1503, the second mirror element 1503 being operationally coupled with the first mirror element 1502. The beam correction system 1500 is configured for correcting for both angle changes and lateral position changes of the wavefront (ex.—light; beam) produced by the laser system.

In embodiments of the present disclosure, the beam correction system 1500 may be configured for receiving incident light 1501. The incident light 1501 may reflect off of the first mirror 1502, said first mirror 1502 imparting an additional angle to light 1501. Further, the light 1501 may then reflect off of the second mirror 1503, thereby producing exiting light 1504. In further embodiments, the first mirror 1502 may be displaced (via a small angle change 1505) to produce a lateral displacement 1506 in proximity to the second mirror 1503. The second mirror 1503 may then provide (ex.—make) a small angle change 1507. The net angle change may be the sum of angle 1505 and angle 1507. If angle change 1507 is equal and opposite to angle change 1505, then no net angle change is present and a pure displacement (ex.—pure angle change) 1506 is achieved. A pure angle change may be achieved by keeping the angle of the first mirror 1502 fixed, while changing only the angle of the second mirror 1503.

Figure 16:
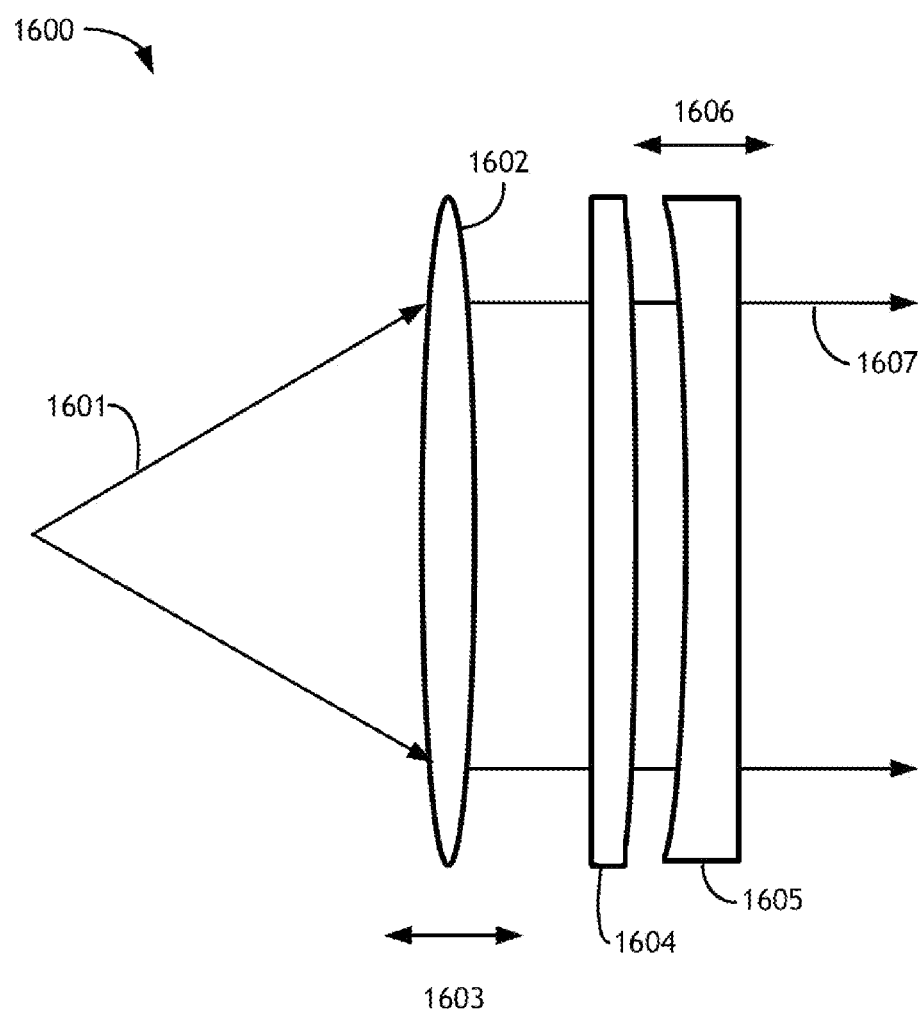
FIG. 16 is a system for correcting wavefront focus and wavefront astigmatism in a single lens system, which may be implemented in one or more of the laser system embodiments described herein, in accordance with a further exemplary embodiment of the present disclosure, wherein the system provides beam astigmatism and focus correction via shifting of the lens.

Referring to FIG. 16, a system for correcting wavefront focus and wavefront astigmatism in a single lens system, which may be implemented in one or more of the laser system embodiments described herein, in accordance with a further embodiment of the present disclosure is shown. In exemplary embodiments, the wavefront focus and astigmatism correction system 1600 may include a first lens (ex.—a spherical lens) 1602, a second lens (ex.—cylindrical lens) 1604 and a third lens (ex.—cylindrical lens) 1605, the lenses (1602, 1604, 1605) being operationally coupled with each other. In the illustrated embodiment shown in FIG. 16, incoming light (ex.—diverging light) 1601 may be received by the system 1600 and may pass through each of the lenses (1602, 1604, 1605), such that said light exits the third lens 1605 as nearly collimated light 1607. In further embodiments, the incoming light 1601 may be diverging, converging or nearly collimated light, while the exiting light 1607 may be diverging, converging or nearly collimated light. In still further embodiments, the system 1600 may include additional lenses (ex.—lens elements) and/or the lens elements may be arranged in a different configuration/arrangement than is shown in FIG. 16.

In exemplary embodiments of the present disclosure, a focus of the wavefront (ex.—light 1601 and/or 1607) may be changed by changing a position 1603 of the first lens element 1602. For example, element 1602 may be positioned (ex.—adjustably positioned) in a variety of ways or via a variety of mechanisms, including via motors and/or piezo elements as explained in previous examples disclosed herein. In further embodiments, an astigmatism of the wavefront may be changed by changing a position 1606 of the third lens element 1605. Lens element 1605 may be positioned via methods/mechanisms similar to the first lens element 1601. The system 1600 discussed herein may effectively manage both wavefront focus and astigmatism aberrations. Multiple aberration correction may also be possible using combinations of techniques presented in previous examples disclosed herein.

Figure 17:
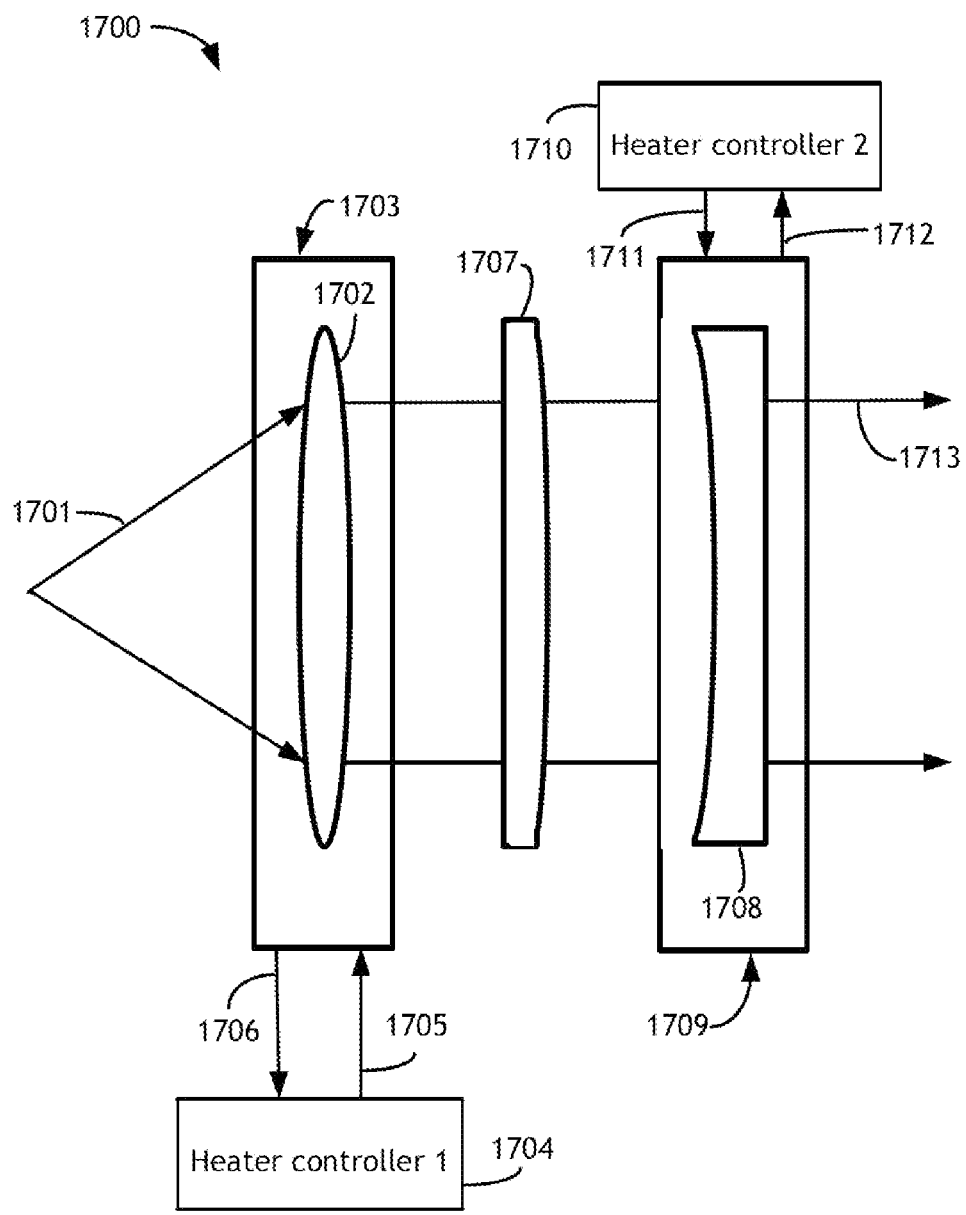
FIG. 17 is a system for correcting wavefront focus and wavefront astigmatism in a single lens system, which may be implemented in one or more of the laser system embodiments described herein, in accordance with a further exemplary embodiment of the present disclosure, wherein beam astigmatism and focus correction is provided using thermal control.

Referring to FIG. 17, a system for correcting wavefront focus and wavefront astigmatism in a single lens system, which may be implemented in one or more of the laser system embodiments described herein, in accordance with a further embodiment of the present disclosure is shown. In exemplary embodiments, the wavefront focus and astigmatism correction system 1700 may include a first lens (ex.—a spherical lens) 1702, a second lens (ex.—cylindrical lens) 1707 and a third lens (ex.—cylindrical lens) 1708, the lenses (1702, 1707, 1708) being operationally coupled with each other. In further embodiments, the first lens 1702 may be connected to (ex.—contained within) a heating assembly (ex.—heating element) 1703. Further, the third lens 1708 may be connected to (ex.—contained within) a heating assembly 1709. In still further embodiments, the system 1700 may include a first heater controller 1704 and a second heater controller 1710. The first heater controller 1704 may be connected to the first heating element 1703, while the second heater controller 1710 may be connected to the second heating element 1709.

In exemplary embodiments, incident light 1701 may be received by (ex.—may enter) the system 1700 and may pass through the first lens 1702, the second lens 1707 and the third lens 1708 and may exit the third lens 1708 as exiting light 1713. In the illustrated embodiment shown in FIG. 17, the incident light 1701 is diverging light and the exiting light 1713 is nearly collimated light. However, in alternative embodiments, the incident light 1701 may be converging or nearly collimated light, and the exiting light 1713 may be converging or diverging light. In further embodiments, a different (ex.—larger or smaller) number of lens elements than is illustrated in FIG. 17 may be implemented in the system 1700. In still further embodiments, the lens elements of the system 1700 may be configured in any one of multiple different configurations or arrangements other than the arrangement shown in FIG. 17.

In an embodiment of the present disclosure, a focus of a wavefront of a laser system may be changed via correction system 1700 by changing a temperature of the first lens element 1702. For example, the first heater controller 1704 may provide current 1705 to the first heating element 1703, which causes the first heating element 1703 to heat the first lens element 1702. The temperature of the first lens element 1702 may be maintained due to the fact that the first lens element 1702, first heating element 1703 and first heater controller 1704 are connected via a closed feedback loop. For example, a temperature sensing element of the first heater controller 1704 may receive an indication 1706 of a current temperature of the first lens element 1702 and/or first heating element 1703. Based on the received indication 1706, the temperature sensing element of the first heater controller 1704 may cause the first heater controller 1704 to provide current or stop providing current for causing the first heating element 1703 to either heat the first lens element 1702 or to stop heating the first lens element 1702.

In exemplary embodiments, an astigmatism of a wavefront of a laser system may be changed by the correction system 1700 by changing a temperature of the third lens element 1708. For example, the second heater controller 1710 may provide current 1711 to the second heating element 1709, which causes the second heating element 1709 to heat the third lens element 1708. The temperature of the third lens element 1708 may be maintained due to the fact that the third lens element 1708, second heating element 1709 and second heater controller 1710 are connected via a closed feedback loop. For example, a temperature sensing element of the second heater controller 1710 may receive an indication 1712 of a current temperature of the third lens element 1708 and/or second heating element 1709. Based on the received indication 1712, the temperature sensing element of the second heater controller 1710 may cause the second heater controller 1710 to provide current or stop providing current for causing the second heating element 1709 to either heat the third lens element 1708 or to stop heating the third lens element 1708. Thus, the system 1700 described herein and illustrated in FIG. 17, may effectively manage both wavefront focus and astigmatism aberrations. Further, the system 1700 may also implement any one or more of the above-described combinations of techniques, mechanisms, and/or methods for promoting the capability of the system 1700 to provide multiple aberration correction. In still further embodiments, the system 1700 may concurrently implement positioning elements and temperature controlled elements.

Figure 18:
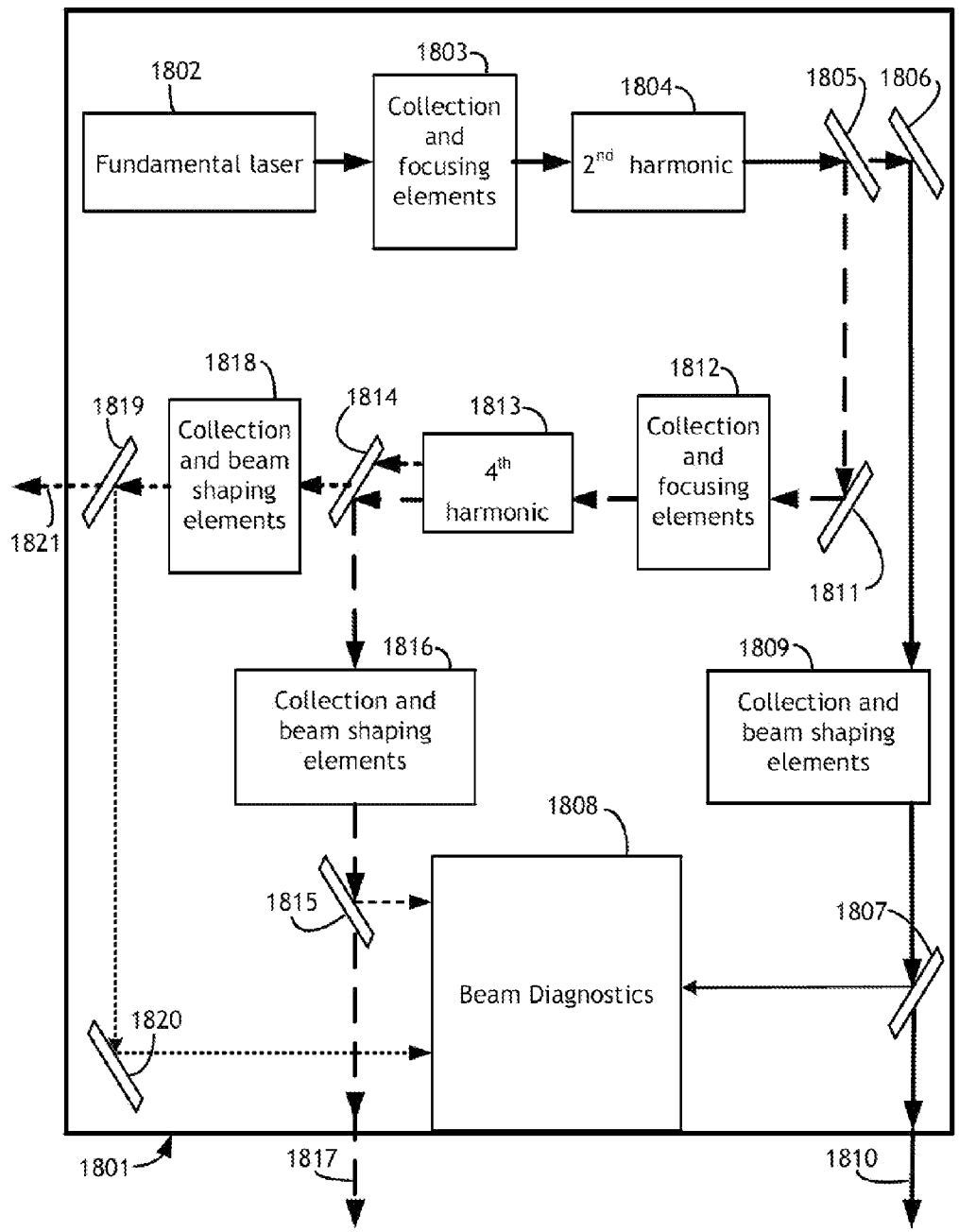
FIG. 18 is a multiple stage frequency converted laser system which includes multiple beam sampling subsystems and multiple beam correction subsystems in accordance with a further exemplary embodiment of the present disclosure.

Referring to FIG. 18, a multiple stage frequency converted laser system which includes multiple beam sampling subsystems and multiple beam correction subsystems in accordance with a further embodiment of the present disclosure is shown. The multiple beam sampling subsystems and multiple beam correction subsystems may be required if more than one of the generated frequencies generated by the laser system 1801 will be used.

In exemplary embodiments, the laser system 1801 includes a fundamental laser 1802 configured for generating (ex.—originating) a laser light (ex.—light). The fundamental laser 1802 may be any standard laser, solid state laser, or fiber laser. In alternative embodiments, the light may be only an output of a fiber which delivers fundamental light produced by an external source. In further embodiments, the system 1801 may include collection and focusing elements 1803, which are connected to the fundamental laser 1802. The system 1801 may further include a second harmonic generating crystal system 1804, which is connected to the collection and focusing elements 1803. For example, an output of the fundamental laser 1802 may be collected and focused via the collection and focusing elements 1803 into the second harmonic generating crystal system 1804. The collection and focusing elements 1803 may include simply a single lens or mirror element, or the collection and focusing elements 1803 may include multiple lens or mirror elements.

In further embodiments, the second harmonic generating crystal system (ex.—the second harmonic subsystem) 1804 may include a heating element for maintaining the crystal of the subsystem 1804 at a desired temperature, and may further include an enclosure for controlling the environment of the crystal of the subsystem 1804. In further exemplary embodiments, other forms of frequency conversion may be used including liquids and gasses.

In an embodiment of the present disclosure, the system 1800 may further include a dichroic element 1805 which may be connected to the second harmonic subsystem 1804 and may be configured for separating fundamental light from second harmonic light. The fundamental light may pass through dichroic element 1805, may reflect off of (ex.—may reflect from) mirror 1806 and may be directed to a beam collection and shaping subsystem 1809. The fundamental light may then proceed to a sampling subsystem 1807. In the embodiment shown in FIG. 18, the sampling subsystem 1807 may include a partially reflecting mirror 1807. However, other examples of a sampling mechanism as disclosed herein may be implemented in or as part of the sampling subsystem 1807. In further embodiments, sampled fundamental light from the beam sampling subsystem 1807 may proceed to a beam diagnostics subsystem 1808 of system 1800. In exemplary embodiments, the beam diagnostics subsystem 1808 may operate on the fundamental light, second harmonic light and fourth harmonic light. Unsampled light from beam sampling subsystem 1807 may then exit the laser system 1801 at 1810.

In exemplary embodiments of the present disclosure, second harmonic light may reflect from dichroic element 1805, may also reflect from mirror 1811, and may then be collected and focused into a fourth harmonic generating crystal system 1813 via collection and focusing elements 1812. Collection and focusing elements 1812 may simply include a single lens or mirror element or may contain multiple elements. The fourth harmonic subsystem 1813 may include a heating element for maintaining a crystal of the subsystem 1813 at a desired temperature, and may also include an enclosure for controlling the environment of the crystal of the subsystem 1813. In further exemplary embodiments, other forms of frequency conversion may be used including liquids and gasses.

In embodiments of the present disclosure, a dichroic element 1814 may be utilized for separating second harmonic light from fourth harmonic light. Second harmonic light may reflect from dichroic element 1814 and may then proceed to beam collection and shaping elements 1816. The second harmonic light may then proceed to sampling subsystem 1815. In the illustrated embodiment, the sampling subsystem 1815 includes a partially reflecting mirror, however other sampling devices or mechanisms may be implemented in further embodiments. In still further embodiments, sampled second harmonic light from the beam sampling subsystem 1815 may then proceed to the beam diagnostics subsystem 1808. Unsampled light 1817 from beam sampling subsystem 1815 then exits the laser system 1801. In exemplary embodiments of the present disclosure, fourth harmonic light proceeds from (ex.—passes through) dichroic element 1814 and is directed to a beam collection and shaping subsystem 1818 and then to a beam sampling subsystem 1819. The beam sampling subsystem 1819 may then direct sampled fundamental light to mirror 1820 and the sampled fundamental light may reflect off of the mirror 1820 and be directed to the beam diagnostics subsystem 1808. Further, unsampled light 1821 which passes through the beam sampling subsystem 1819 may exit the laser system 1801.

Figure 19:
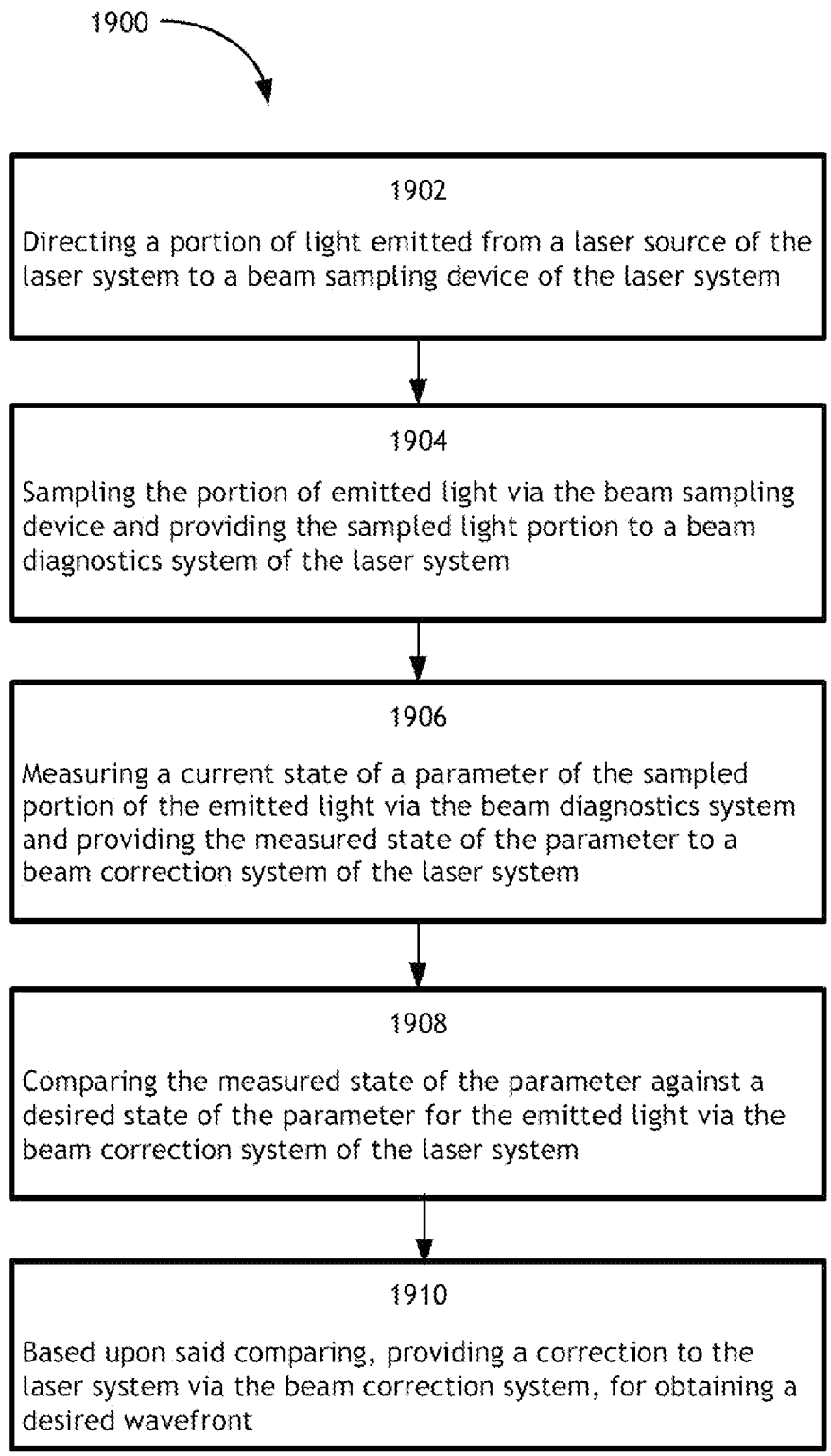
FIG. 19 is a flowchart depicting a method for providing beam correction in a laser system in accordance with a further exemplary embodiment of the present disclosure.

Referring to FIG. 19, a flowchart depicting a method for providing beam correction in a laser system in accordance with a further embodiment of the present disclosure is shown. The method 1900 may include the step of directing a portion of light emitted from a laser source of the laser system to a beam sampling device of the laser system 1902. The method 1900 may further include the step of sampling the portion of emitted light via the beam sampling device and providing the sampled light portion to a beam diagnostics system of the laser system 1904. The method 1900 may further include the step of measuring a current state of a parameter of the sampled portion of the emitted light via the beam diagnostics system and providing the measured state of the parameter to a beam correction system of the laser system 1906. The method 1900 may further include the step of comparing the measured state of the parameter against a desired state of the parameter for the emitted light via the beam correction system of the laser system 1908. The method 1900 may further include the step of, based upon said comparing, providing a correction to the laser system via the beam correction system, for obtaining a desired wavefront 1910.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A laser system, comprising:
   a laser source, the laser source configured for generating and emitting light;
   a beam sampling device, the beam sampling device being operationally coupled with the laser source;
   a beam diagnostics system, the beam diagnostics system being operationally coupled with the beam sampling device, the beam diagnostics system being configured for receiving the sampled portion of the emitted light and measuring a current state of a parameter of the sampled portion of the emitted light; and
   a beam correction system, the beam correction system being operationally coupled with the beam diagnostics system, the beam correction system being configured for obtaining the measured state from the beam diagnostics system, comparing the measured state of the parameter against a desired state of the parameter for the emitted light and providing a correction to the laser system based upon said comparing, the beam correction system including a set of correction optics disposed between one or more degrading optical elements acting to degrade the emitted light and the beam sampling device, the beam sampling device being configured for selectively sampling a portion of the emitted light upon exiting the one or more degrading optical elements and the set of correction optics.

2. A laser system as claimed in claim 1, wherein the parameter is one of: a beam waist location of the sampled portion of the emitted light and an astigmatism of the sampled portion of the emitted light.

3. A laser system as claimed in claim 1, wherein the beam diagnostics system includes a wavefront sensor, the wavefront sensor utilizing one of: a lens array and an aperture array.

4. A laser system as claimed in claim 1, wherein the beam diagnostics system includes a M-Squared (M2) measurement system configured for measuring a beam profile of the sampled portion of the emitted light.

5. A laser system as claimed in claim 1, wherein the set of correction optics of the beam correction system includes one of: a lens or a mirror element.

6. A laser system as claimed in claim 1, wherein the beam sampling device is one of: a holographic beam sampling device and a partially transmitting mirror.

7. A laser system as claimed in claim 1, wherein the beam sampling device is a substrate, said substrate including a first surface, the first surface being a partially reflecting surface.

8. A laser system as claimed in claim 5, wherein the lens or mirror element is moved from a first position to a second position when the correction is provided for obtaining a desired wavefront.

9. A laser system as claimed in claim 5, wherein a temperature of the lens or mirror element is changed from a first temperature to a second temperature when the correction is provided for obtaining a desired wavefront.

10. A laser system as claimed in claim 5, wherein at least one of: a tilt angle of the lens or mirror element and a rotation angle of the lens or more element is adjusted when the correction is provided for obtaining a desired wavefront.

11. A laser system as claimed in claim 5, wherein one of: a motor device, a piezo device, and an electrorestrictive device is utilized for moving the lens or mirror element from the first position to the second position.

12. A laser system as claimed in claim 5, wherein the lens or mirror element includes rotationally symmetric surfaces, one of the rotationally symmetric surfaces having a cylindrical profile.

13. A laser system as claimed in claim 7, wherein the substrate includes a second surface, the second surface being coated with an anti-reflective material.

14. A laser system as claimed in claim 7, wherein the partially reflecting surface is one of: non-coated glass, fused silica, calcium fluoride and magnesium fluoride.

15. A laser system as claimed in claim 1, wherein the set of correction optics of the beam correction system includes one of: two lenses or two mirror elements.

16. A laser system as claimed in claim 15, wherein a relative spacing between the two lenses or two mirror elements is changed when the correction is provided for obtaining a desired wavefront.

17. A laser system as claimed in claim 15, wherein each of the two lenses or two mirror elements includes a cylindrical surface.

18. A laser system as claimed in claim 17, wherein the two lenses or two mirror elements are rotated between a first orientation, in which cylindrical surfaces of the two lenses or two mirror elements are orthogonally aligned with respect to each other, and a second orientation, in which the cylindrical surfaces of the two lenses or two mirror elements are in a parallel alignment with respect to each other when the correction is provided for obtaining a desired wavefront.

19. A method for providing beam correction in a laser system, the method comprising:
   directing a portion of light emitted from a laser source of the laser system to a beam sampling device of the laser system;
   sampling the portion of emitted light exiting one or more degrading optical elements and a set of correction optics via the beam sampling device and providing the sampled light portion to a beam diagnostics system of the laser system;
   measuring a current state of a parameter of the sampled portion of the emitted light via the beam diagnostics system and providing the measured state of the parameter to a beam correction system of the laser system;
   comparing the measured state of the parameter against a desired state of the parameter for the emitted light via the beam correction system of the laser system; and
   based upon said comparing, providing a correction to the laser system via the beam correction system, for obtaining a desired wavefront.

20. A laser system, comprising:
   a laser source, the laser source configured for generating and emitting fundamental light;
   a beam sampling device, the beam sampling device being operationally coupled with the laser source;
   a beam diagnostics system, the beam diagnostics system being operationally coupled with the beam sampling device, the beam diagnostics system being configured for receiving the sampled portion of the emitted light and measuring a current state of a wavefront parameter of the sampled portion of the emitted light, the wavefront parameter being one of: a beam waist location of the sampled portion of the emitted light, and an astigmatism of the sampled portion of the emitted light; and
   a beam correction system, the beam correction system being operationally coupled with the beam diagnostics system, the beam correction system being configured for obtaining the measured state from the beam diagnostics system, comparing the measured state of the wavefront parameter against a desired state of the wavefront parameter for the emitted light and providing a correction to the laser system based upon said comparing, the beam correction system including a set of correction optics disposed between one or more degrading optical elements acting to degrade the emitted light and the beam sampling device, the beam sampling device being configured for selectively sampling a portion of the emitted light upon exiting the one or more degrading optical elements and the set of correction optics.

* * * * *